United States Patent
Svendsen

(10) Patent No.: US 8,630,494 B1
(45) Date of Patent: Jan. 14, 2014

(54) METHOD AND SYSTEM FOR SHARING IMAGE CONTENT BASED ON COLLECTION PROXIMITY

(75) Inventor: Hugh Blake Svendsen, Chapel Hill, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 78 days.

(21) Appl. No.: 13/221,882

(22) Filed: Aug. 30, 2011

Related U.S. Application Data

(60) Provisional application No. 61/379,379, filed on Sep. 1, 2010.

(51) Int. Cl.
G06K 9/62 (2006.01)

(52) U.S. Cl.
USPC .......................................... 382/209

(58) Field of Classification Search
None
See application file for complete search history.

(56) References Cited

U.S. PATENT DOCUMENTS

| | | | |
|---|---|---|---|
| 6,526,158 B1 | 2/2003 | Goldberg | |
| 6,591,068 B1 | 7/2003 | Dietz | |
| 6,606,398 B2 | 8/2003 | Cooper | |
| 6,745,186 B1 | 6/2004 | Testa et al. | |
| 6,819,783 B2 | 11/2004 | Goldberg et al. | |
| 7,068,309 B2 | 6/2006 | Toyama et al. | |
| 7,107,605 B2 | 9/2006 | Janik | |
| 7,203,367 B2 | 4/2007 | Shniberg et al. | |
| 7,260,587 B2 | 8/2007 | Testa et al. | |
| 7,266,563 B2 | 9/2007 | Morris et al. | |
| 7,376,276 B2 | 5/2008 | Shniberg et al. | |
| 7,376,696 B2 | 5/2008 | Bell et al. | |
| 7,391,886 B1 | 6/2008 | Clark et al. | |
| 7,426,532 B2 | 9/2008 | Bell et al. | |
| 7,472,134 B2 | 12/2008 | Kaku | |
| 7,515,754 B2 * | 4/2009 | Hung | 382/218 |
| 7,526,106 B1 | 4/2009 | Clark et al. | |
| 7,561,723 B2 | 7/2009 | Goldberg et al. | |
| 7,684,651 B2 | 3/2010 | Bao et al. | |
| 7,730,130 B2 | 6/2010 | Issa | |
| 7,739,304 B2 | 6/2010 | Naaman et al. | |
| 7,783,085 B2 | 8/2010 | Alspector et al. | |
| 7,860,347 B2 | 12/2010 | Bao et al. | |
| 7,933,972 B1 | 4/2011 | Issa et al. | |
| 7,953,690 B2 | 5/2011 | Luo et al. | |
| 7,965,908 B2 | 6/2011 | Hayashi | |
| 8,014,572 B2 | 9/2011 | Tang et al. | |

(Continued)

OTHER PUBLICATIONS

Xin Fan; Xing Xie; Zhiwei Li; Mingjing Li; and Wei-Ying Ma, "Photo-to-Search: Using Multimodal Queries to Search the Web from Mobile Devices", Nov. 10-11, 2005.*

*Primary Examiner* — Samir Ahmed
*Assistant Examiner* — Siamak Harandi

(57) ABSTRACT

Systems, methods, and computer readable medium are described for performing an action based on determining that the contents of a first image collection and a second image collection are similar. In one aspect, the present disclosure relates to comparing digests representing the two image collections to determine proximity. The digest may be obtained and the comparison made at either a collection sharing device or at a proxy server. The actions performed based on a proximity determination may comprise notifying a user of a first collection sharing device of the availability of other collection sharing devices, or the retrieval of one or more images from the other image collections. In another aspect of the present disclosure, proximity may be measured by comparing subject faces comparing in a first image collection to the faces present in a second image collection.

19 Claims, 19 Drawing Sheets

(56) References Cited

U.S. PATENT DOCUMENTS

| | | |
|---|---|---|
| 8,144,944 B2 | 3/2012 | Ishii |
| 8,189,880 B2 | 5/2012 | Tang et al. |
| 8,233,679 B2 | 7/2012 | Alspector et al. |
| 8,284,990 B2 | 10/2012 | Ma et al. |
| 8,306,284 B2 | 11/2012 | Angell et al. |
| 8,315,463 B2 | 11/2012 | Gallagher et al. |
| 8,325,999 B2 | 12/2012 | Kapoor et al. |
| 8,358,811 B2 | 1/2013 | Adams et al. |
| 2002/0126150 A1 | 9/2002 | Parry |
| 2003/0063770 A1 | 4/2003 | Svendsen et al. |
| 2003/0063771 A1 | 4/2003 | Morris et al. |
| 2003/0095152 A1 | 5/2003 | Fong |
| 2003/0161499 A1 | 8/2003 | Svendsen |
| 2004/0044723 A1 | 3/2004 | Bell et al. |
| 2004/0044724 A1 | 3/2004 | Bell et al. |
| 2004/0044725 A1 | 3/2004 | Bell et al. |
| 2004/0174440 A1 | 9/2004 | Kojima et al. |
| 2004/0208372 A1* | 10/2004 | Boncyk et al. ............ 382/181 |
| 2005/0162711 A1 | 7/2005 | Wu |
| 2005/0280502 A1 | 12/2005 | Bell |
| 2006/0008256 A1* | 1/2006 | Khedouri et al. ............ 386/124 |
| 2006/0048059 A1 | 3/2006 | Etkin |
| 2006/0161867 A1 | 7/2006 | Drucker et al. |
| 2007/0118508 A1 | 5/2007 | Svendsen |
| 2007/0118509 A1 | 5/2007 | Svendsen |
| 2007/0118525 A1 | 5/2007 | Svendsen |
| 2008/0189766 A1 | 8/2008 | Bell et al. |
| 2008/0195962 A1 | 8/2008 | Lin et al. |
| 2008/0298766 A1 | 12/2008 | Wen et al. |
| 2008/0310688 A1 | 12/2008 | Goldberg |
| 2009/0063995 A1 | 3/2009 | Baron |
| 2009/0080714 A1 | 3/2009 | Koda |
| 2009/0199226 A1 | 8/2009 | Suchiro |
| 2009/0216806 A1 | 8/2009 | Feuerstein et al. |
| 2009/0234815 A1 | 9/2009 | Boerries et al. |
| 2009/0292549 A1 | 11/2009 | Ma et al. |
| 2010/0036875 A1 | 2/2010 | Miezianko et al. |
| 2010/0150407 A1 | 6/2010 | Cheswick |
| 2010/0172550 A1 | 7/2010 | Gilley et al. |
| 2010/0310135 A1 | 12/2010 | Nagaoka et al. |
| 2011/0022529 A1 | 1/2011 | Barsoba et al. |
| 2011/0038512 A1 | 2/2011 | Adam et al. |
| 2011/0182482 A1 | 7/2011 | Winters et al. |
| 2011/0182485 A1 | 7/2011 | Shochat et al. |
| 2011/0188742 A1 | 8/2011 | Joshi et al. |
| 2011/0211736 A1 | 9/2011 | Abramovski et al. |
| 2011/0211737 A1 | 9/2011 | Krupka et al. |

* cited by examiner

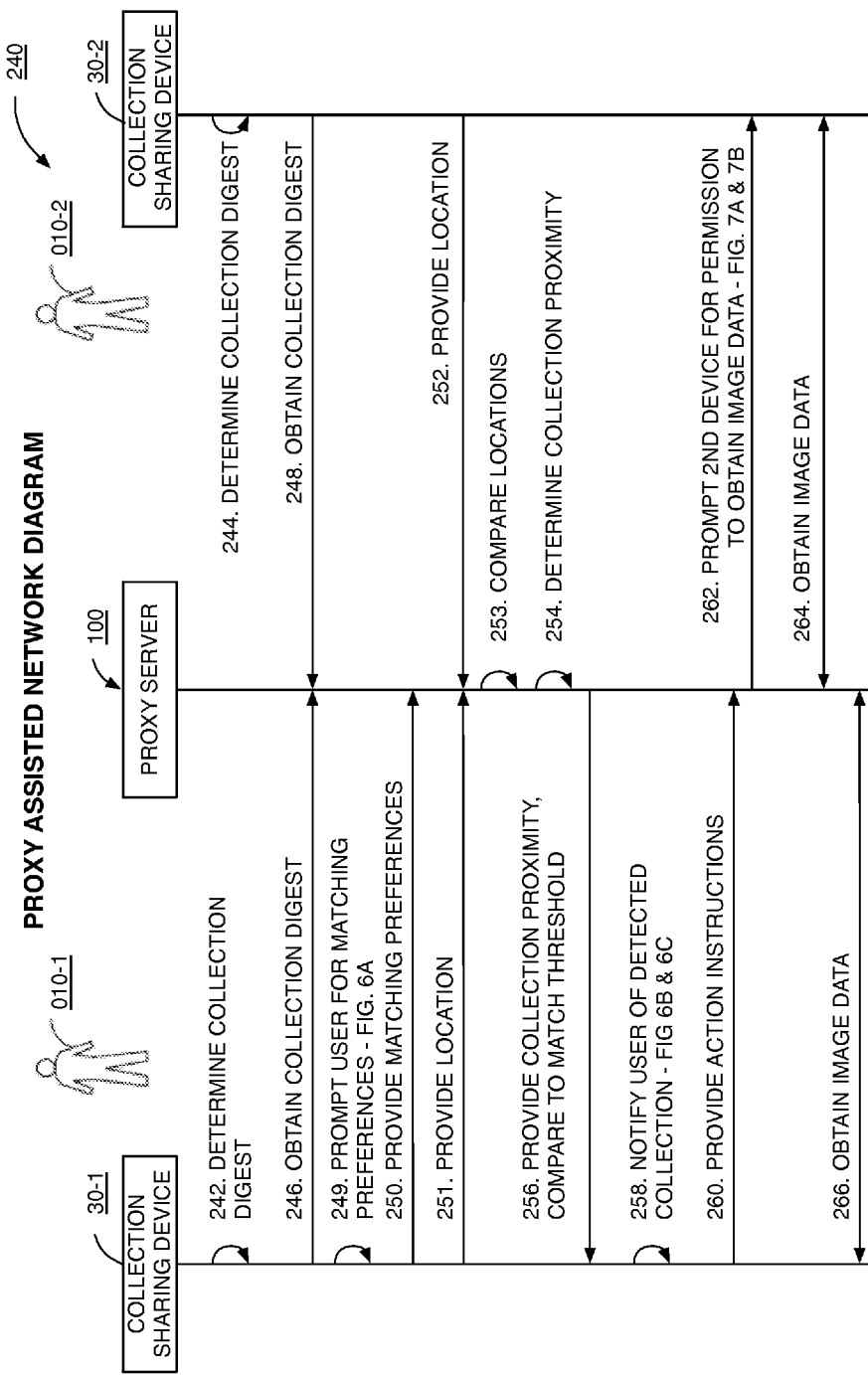

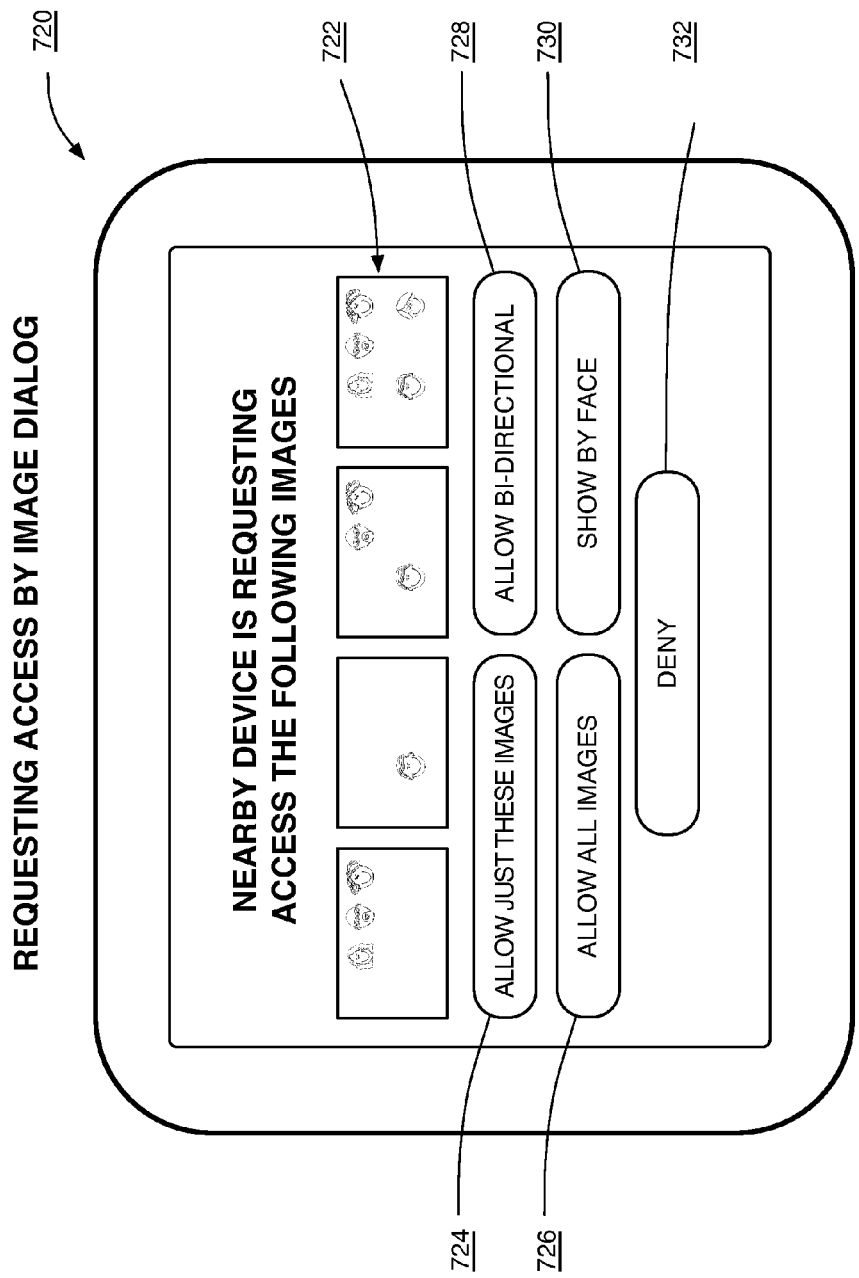

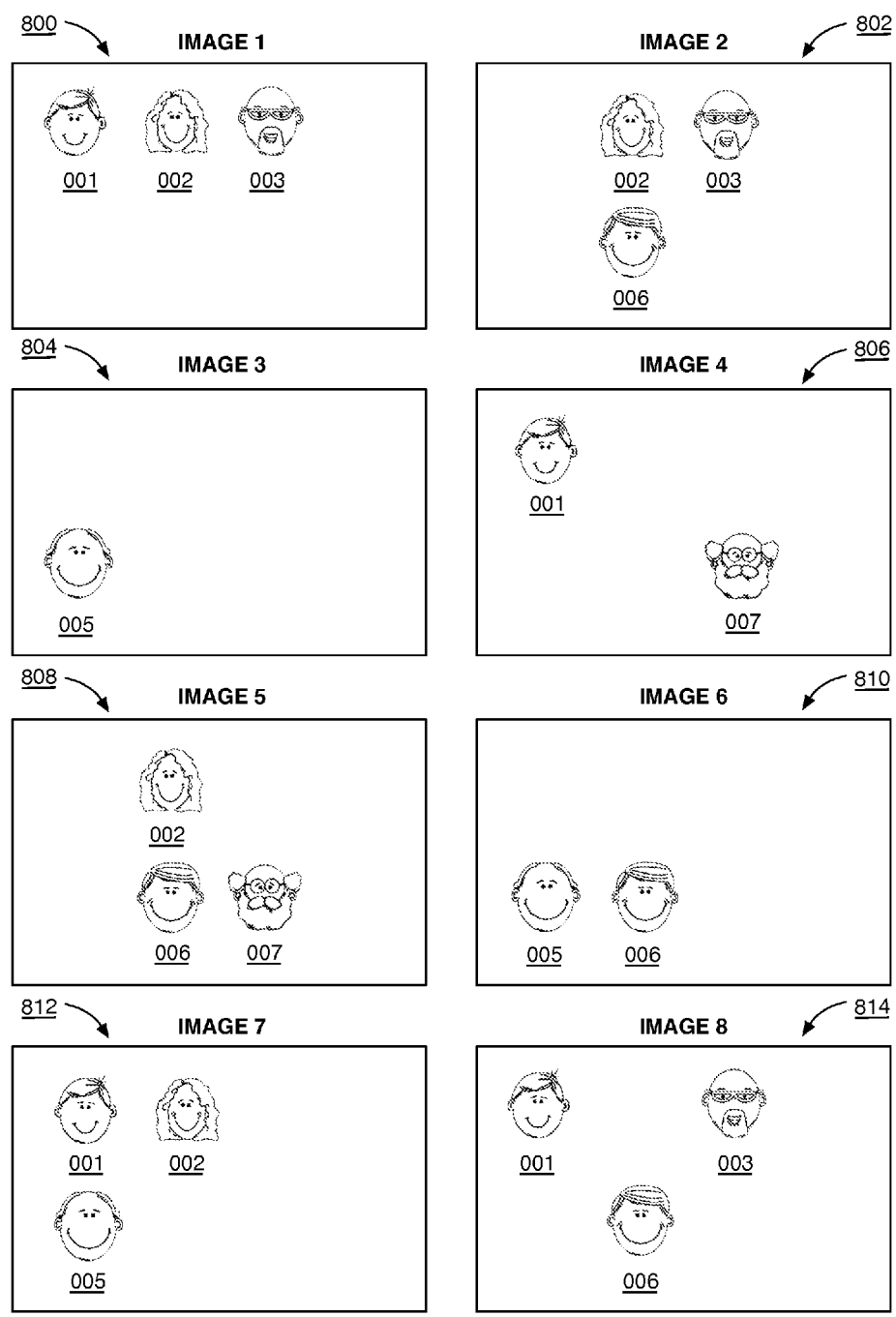
FIG. 8A IMAGE COLLECTION I

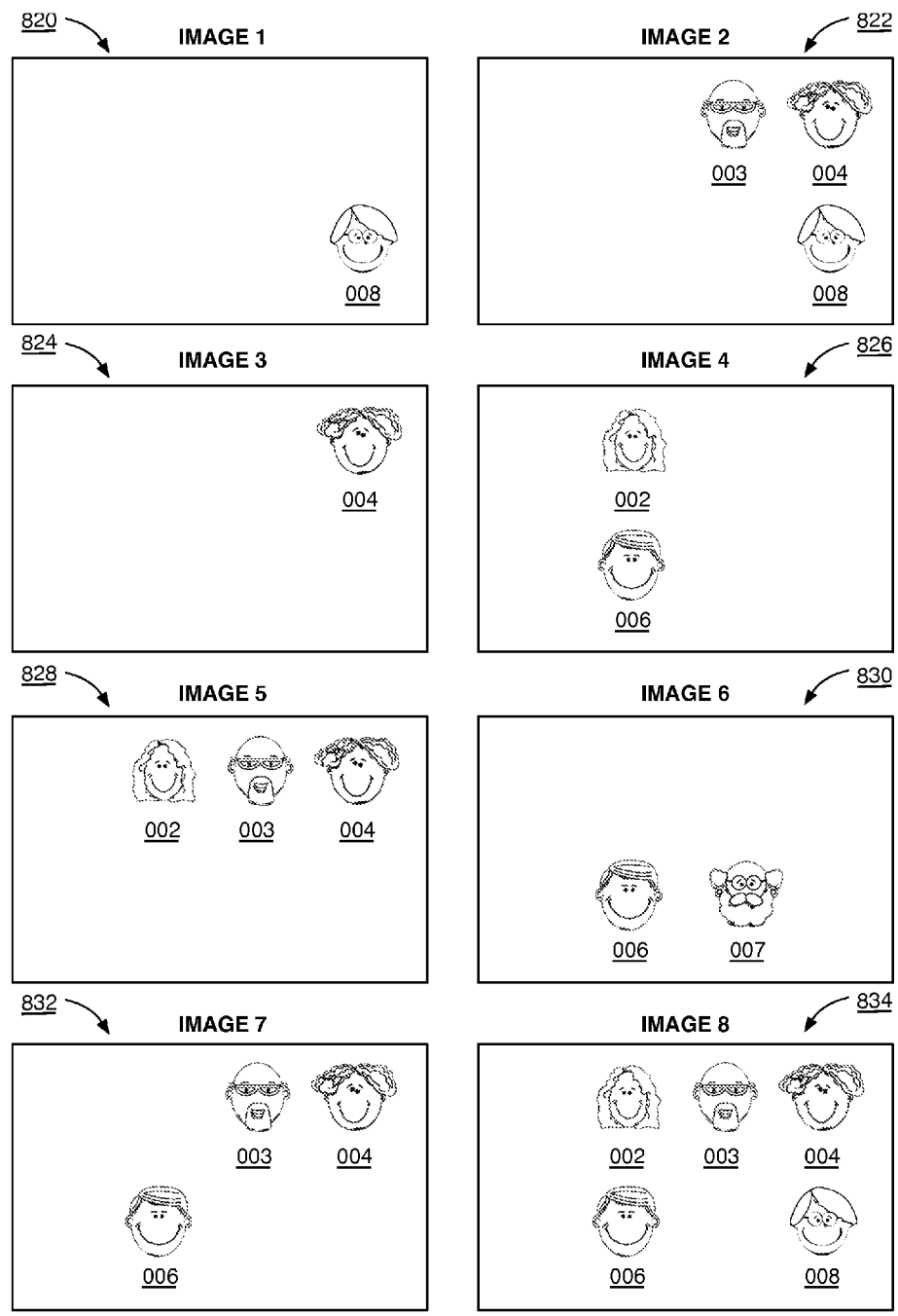
FIG. 8B IMAGE COLLECTION II

FACE OCCURRENCE MATRIX FOR COLLECTION I ~ 900

| | SUBJECT 1 | SUBJECT 2 | SUBJECT 3 | SUBJECT 4 | SUBJECT 5 | SUBJECT 6 | SUBJECT 7 | SUBJECT 8 | |
|---|---|---|---|---|---|---|---|---|---|
| IMAGE 1 | 1 | 1 | 1 | 0 | 0 | 0 | 0 | 0 | 3 |
| IMAGE 2 | 0 | 1 | 1 | 0 | 0 | 1 | 0 | 0 | 3 |
| IMAGE 3 | 0 | 0 | 0 | 0 | 1 | 0 | 0 | 0 | 1 |
| IMAGE 4 | 1 | 0 | 0 | 0 | 0 | 0 | 1 | 0 | 2 |
| IMAGE 5 | 0 | 1 | 0 | 0 | 0 | 1 | 1 | 0 | 3 |
| IMAGE 6 | 0 | 0 | 0 | 0 | 1 | 1 | 0 | 0 | 2 |
| IMAGE 7 | 1 | 1 | 0 | 0 | 1 | 0 | 0 | 0 | 3 |
| IMAGE 8 | 1 | 0 | 3 | 0 | 0 | 1 | 0 | 0 | 3 |
| | 4 | 4 | 1 | 0 | 3 | 4 | 2 | 0 | |

FACE OCCURRENCE MATRIX FOR COLLECTION II ~ 910

| | SUBJECT 1 | SUBJECT 2 | SUBJECT 3 | SUBJECT 4 | SUBJECT 5 | SUBJECT 6 | SUBJECT 7 | SUBJECT 8 | |
|---|---|---|---|---|---|---|---|---|---|
| IMAGE 1 | 0 | 0 | 0 | 0 | 0 | 0 | 0 | 1 | 1 |
| IMAGE 2 | 0 | 0 | 1 | 1 | 0 | 0 | 0 | 1 | 3 |
| IMAGE 3 | 0 | 0 | 0 | 1 | 0 | 0 | 0 | 0 | 1 |
| IMAGE 4 | 0 | 1 | 0 | 0 | 0 | 1 | 0 | 0 | 2 |
| IMAGE 5 | 0 | 1 | 1 | 1 | 0 | 0 | 0 | 0 | 3 |
| IMAGE 6 | 0 | 0 | 0 | 0 | 0 | 1 | 1 | 0 | 2 |
| IMAGE 7 | 0 | 0 | 1 | 1 | 0 | 1 | 0 | 0 | 3 |
| IMAGE 8 | 0 | 1 | 1 | 1 | 0 | 1 | 0 | 1 | 5 |
| | 0 | 3 | 4 | 5 | 0 | 4 | 1 | 3 | |

METHOD AND SYSTEM FOR SHARING IMAGE CONTENT BASED ON COLLECTION PROXIMITY

RELATED APPLICATIONS

The present application claims priority from U.S. Provisional Application No. 61/379,379 filed on Sep. 1, 2010, the disclosure of which is hereby incorporated herein by reference in its entirety.

FIELD OF THE DISCLOSURE

The present disclosure relates to performing an action based on proximity matching between two image collections available on two collection sharing devices respectively. In one embodiment of the present disclosure, the action performed comprises obtaining image data from the second collection sharing device at the first collection sharing device.

BACKGROUND OF THE DISCLOSURE

In recent years there has been an enormous increase in the in the amount of digital images being captured. This increase has been fueled by decreasing digital camera prices, increases in quality and ease of use of digital cameras, and the broad adoption of digital image capture features in cell smartphones at all price levels. This proliferation of digital imaging content has exacerbated the long standing problem of sharing digital images with those who would desire to view them.

Many companies, technologies, and approaches have emerged to address this issue of image sharing. Some companies have taken an image centric centralized approach whereby users upload images to a server and invite other uses to come and view the images. Examples of companies taking this approach include ShutterFly™, Snapfish™, Flickr™, and the like. Other companies take a user centric social approach, whereby existing friend connections may be exploited to distribute images. Examples of companies taking this approach include FaceBook™, MySpace™, and the like.

The problem with these traditional approaches is that they require considerable effort by the sharing user and are not pre-emptive in nature. Predominately, the users must go looking for the images they are interested in instead of the images finding them. These traditional approaches also fail to make connections between users based on the content of their image collections.

SUMMARY OF THE DISCLOSURE

With the proliferation of electronic devices capable of capturing, storing, and sharing digital images, there is a need for improved methods of sharing digital images requiring minimal effort from users. In the present disclosure, methods systems, and non transitory computer readable medium are described whereby a first collection sharing device is configured to detect the presence of a second collection sharing device on a network. A comparison is made between a first image collection digest representing a first image collection and a second image collection digest representing a second image collection to determine collection proximity. The collection proximity is subsequently compared to a match threshold to determine a proximity match. Based on the proximity match, actions may be performed.

In one aspect of the present disclosure the action performed comprises prompting the user of a first image collection device with a notification indicating the presence of the second image collection, and prompting the user of the second collection sharing device with a notification requesting access to it's image collection. In another aspect of the present disclosure, image content from the second image collection is transferred to and/or displayed on the first collection sharing device.

The proximity between the first image collection and second image collection is determined based on a number of weighting factors extracted from the images comprising the collections. The weighting factors may include geographical proximity, temporal proximity, keyword proximity, author proximity, subject face proximity, and image scene proximity, and event proximity.

In another aspect of the present disclosure, collection proximity is determined based on comparing matching preferences from a first collection sharing device to an image collection digest of a second sharing device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 2B illustrates the operation of the system of FIG. 1 according to another embodiment of the present disclosure;

Figure 1:
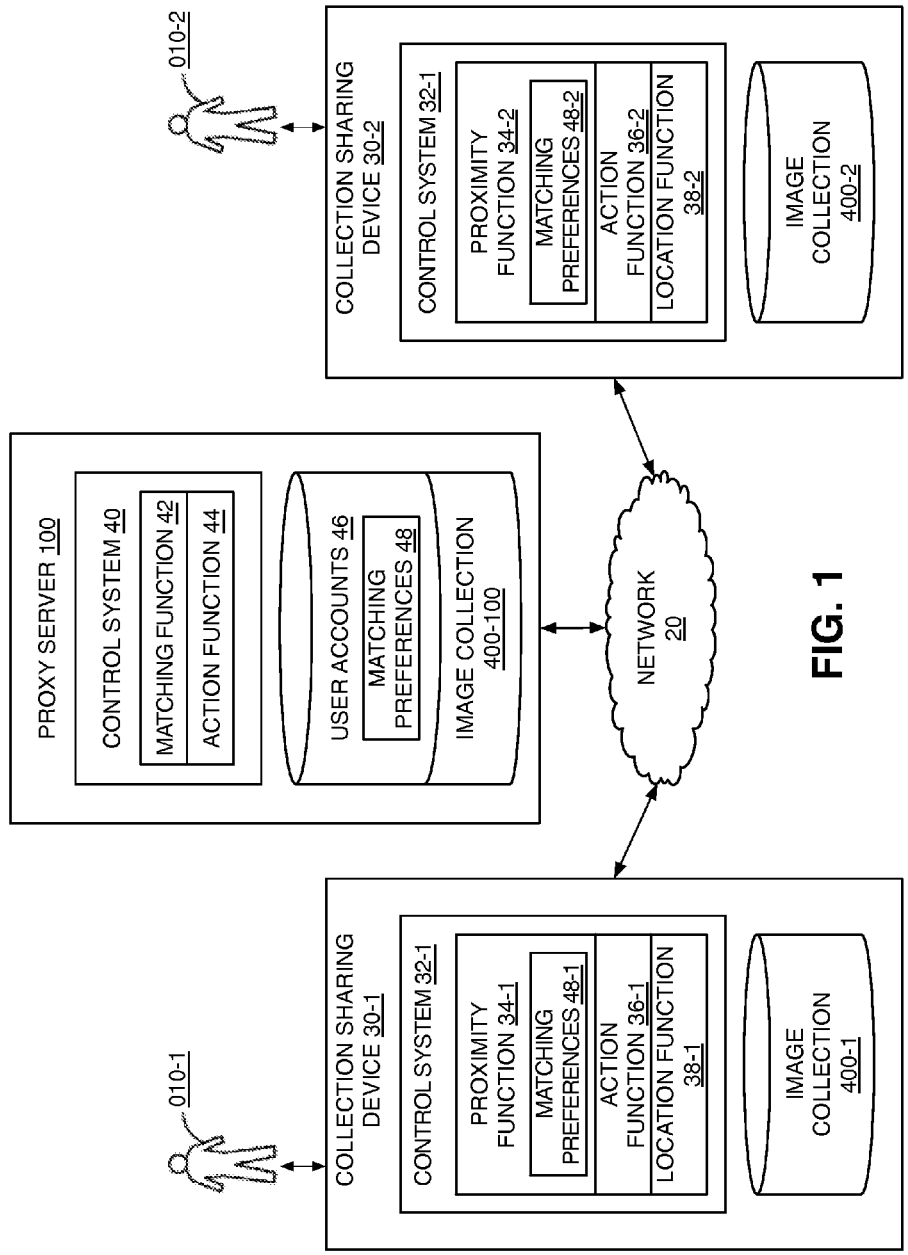
FIG. 1 illustrates a system for performing an action based on a comparison of two image collection digests from a respective two collection sharing devices.
Figures 4A, 4B:
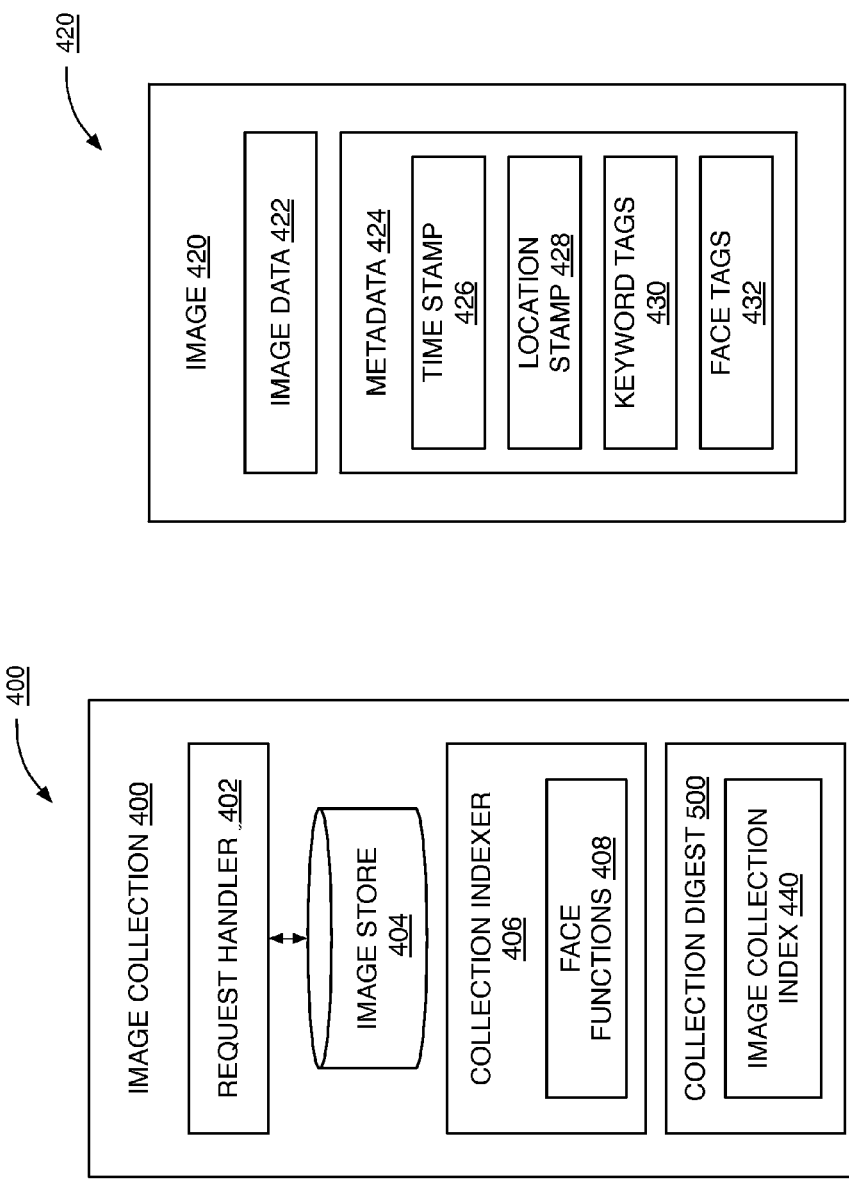
FIG. 4A is a block diagram of an exemplary embodiment of the image collection subsystem shown in FIG. 2 responsible for indexing imaging content and providing a collection index over a network to other collection sharing devices.
FIG. 4B is a block diagram of an exemplary embodiment of the data structure used to represent an image.
Figure 4C:
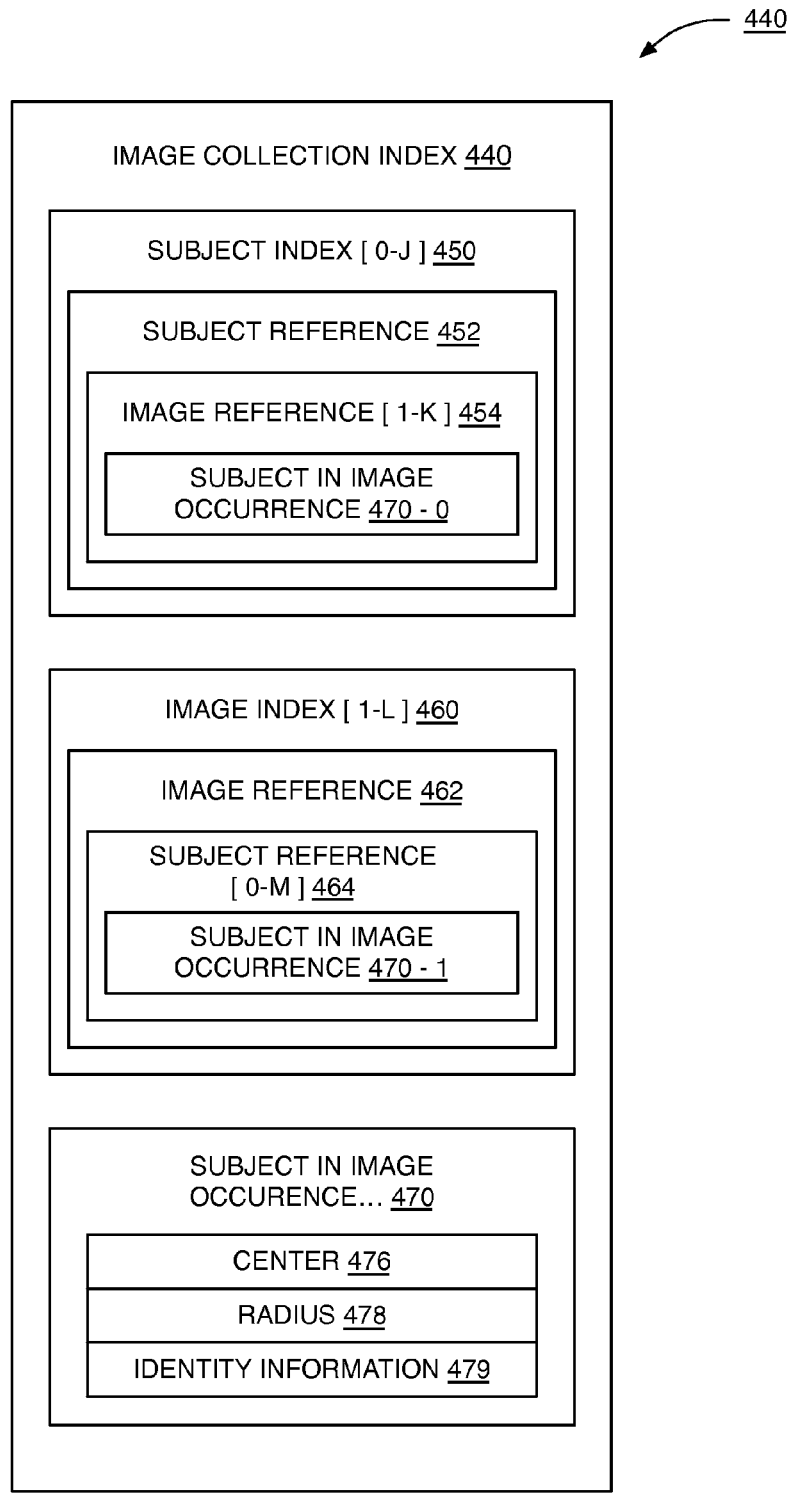
FIG. 4C is a block diagram of an exemplary embodiment of the data structure used to represent a digital image collection index as shown in FIG. 4A.
Figure 4D:
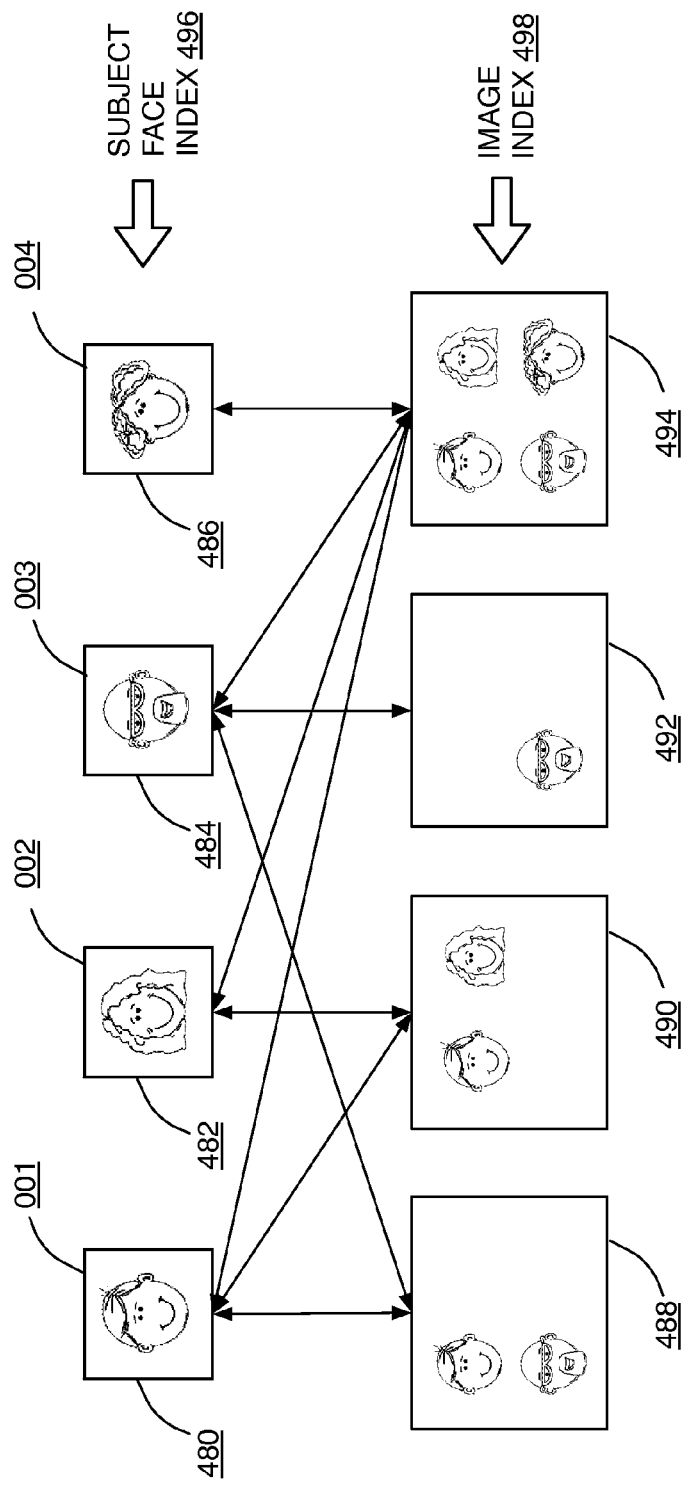
Figure 5:
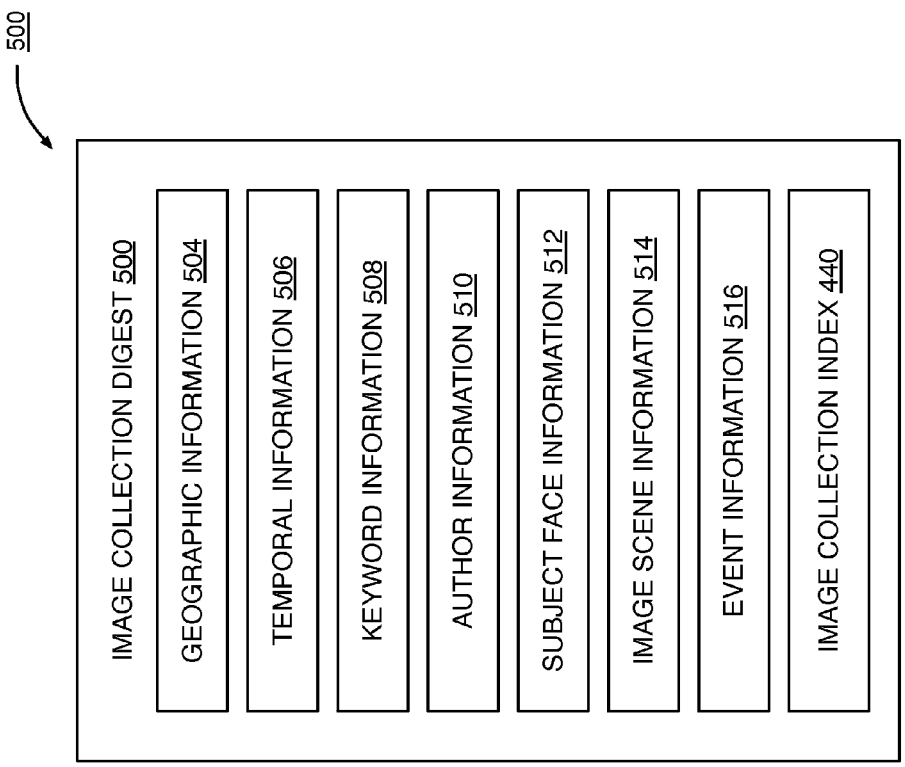
Figure 6A:
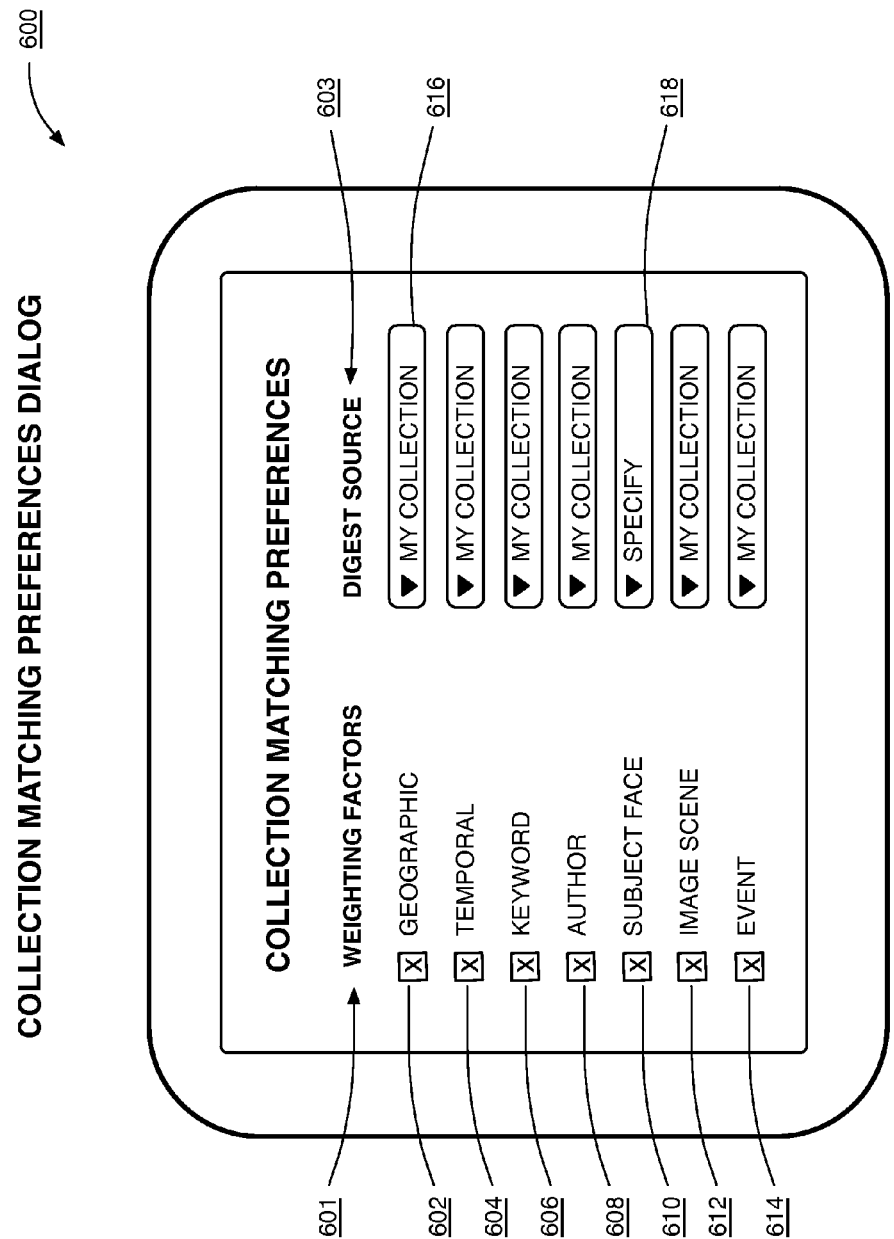
Figure 6B:
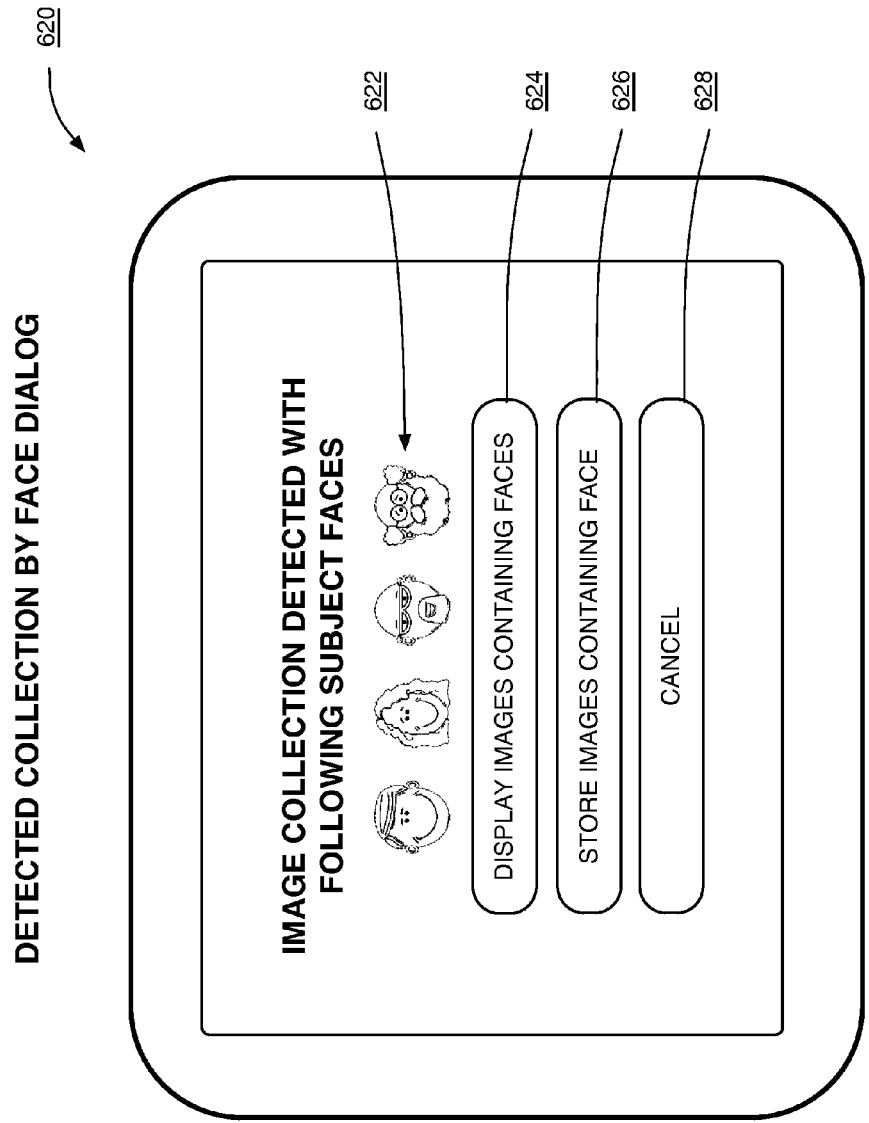
Figure 6C:
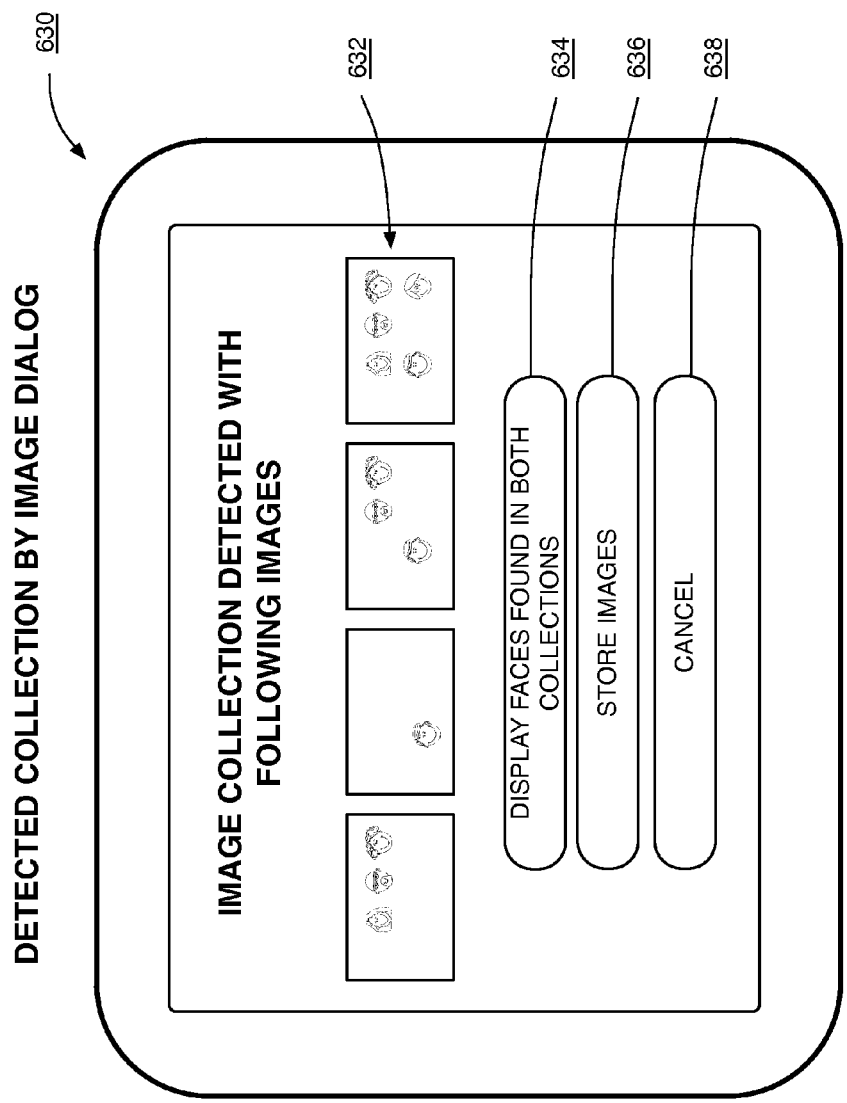
Figure 7A:
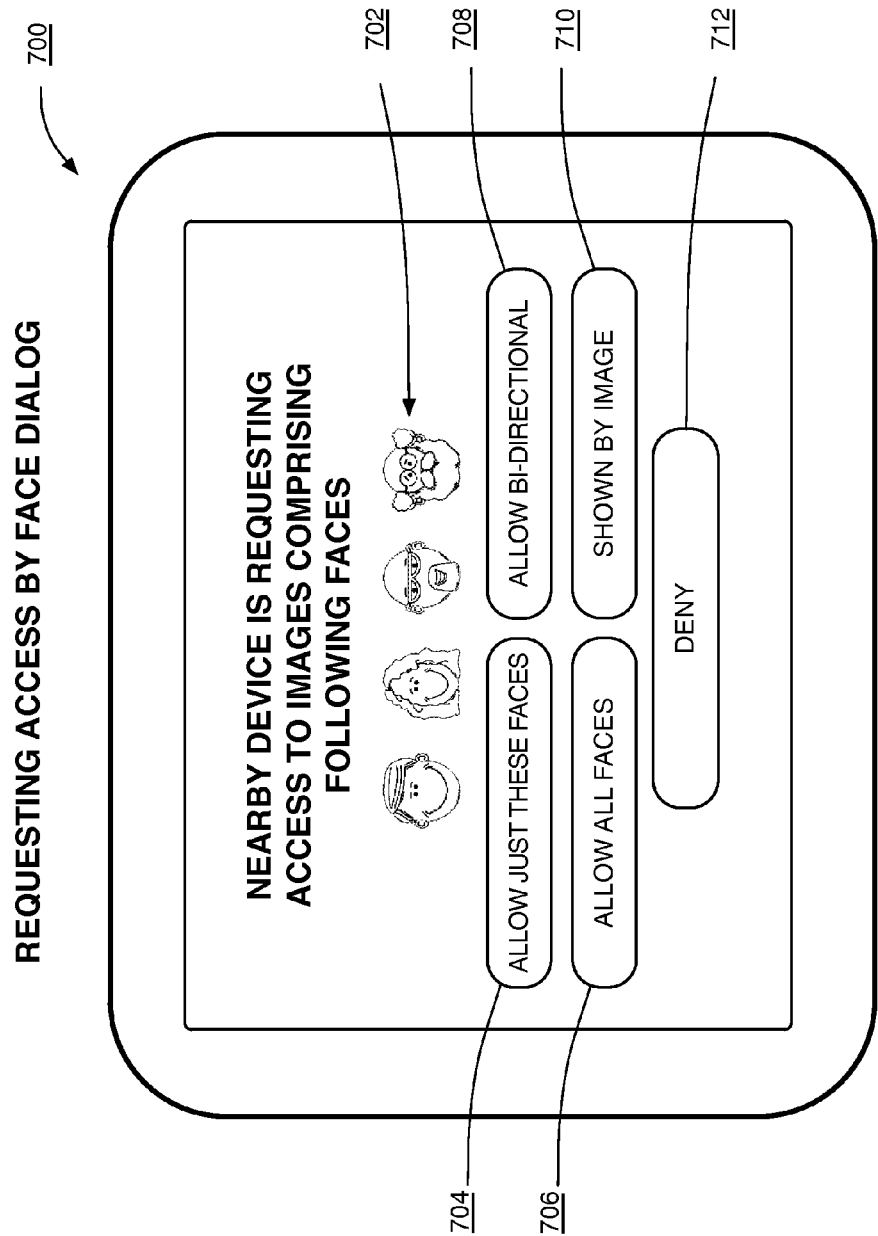
Figure 10:
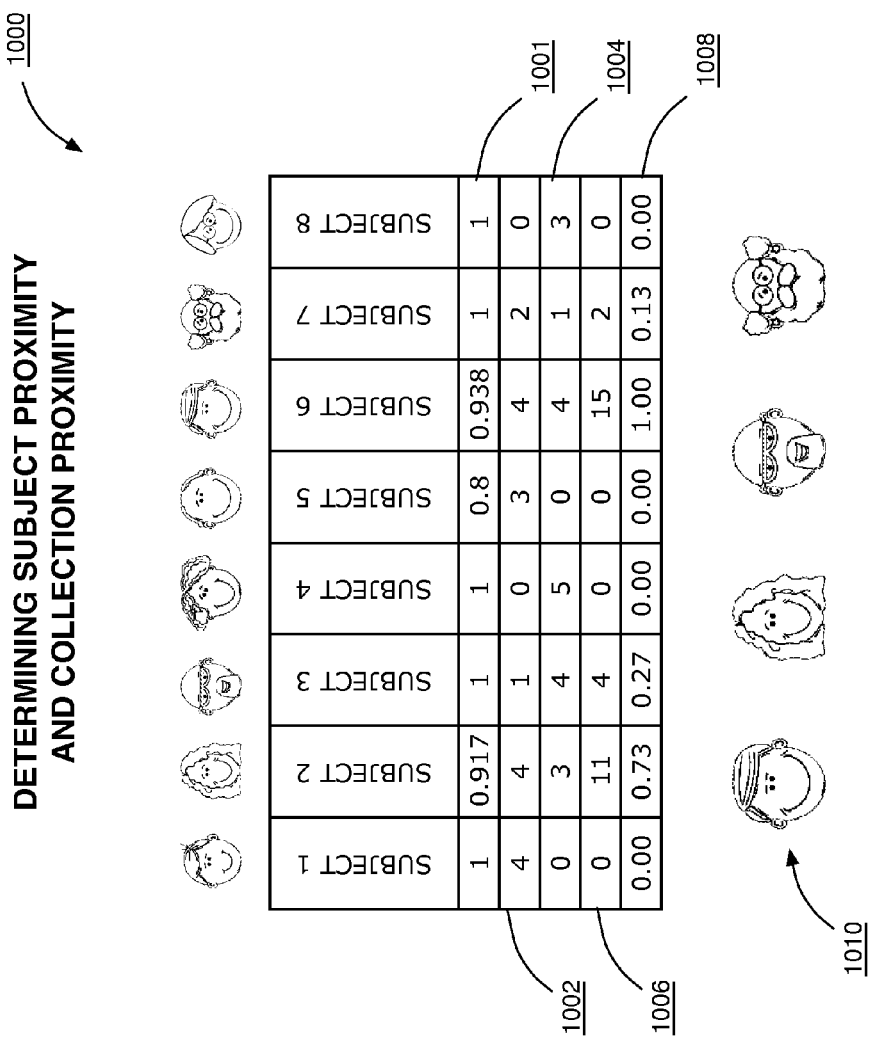
Figure 11:
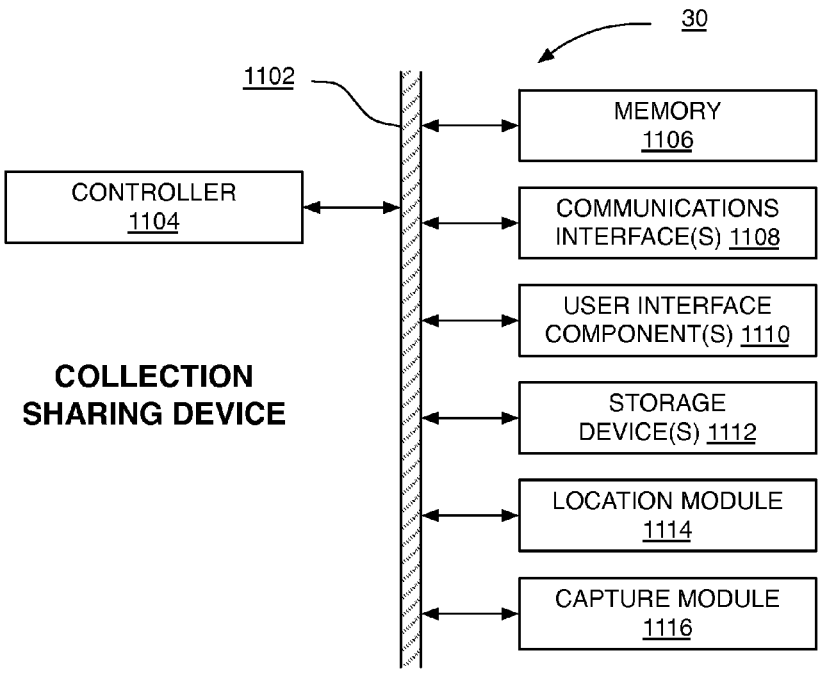
Figure 12:
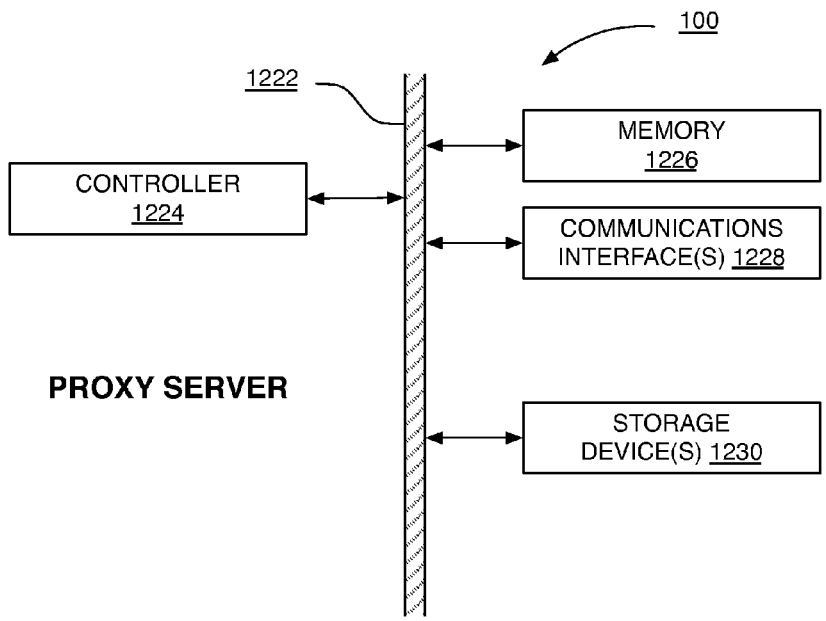

FIG. 4D graphically illustrates an exemplary image collection indexed by both subject and image;

FIG. 5 illustrates an exemplary embodiment of an image collection digest that operates to exchange information regarding the contents on the image collection of FIG. 1 and FIG. 2;

FIG. 6A illustrates an exemplary graphical user interface that operates to obtain matching preferences to be used in matching image collection digests;

FIGS. 6B & 6C illustrate exemplary graphical user interfaces operable to notify the user of a first collection sharing device that a second collection sharing device has been detected on the network;

FIGS. 7A & 7B illustrate an exemplary graphical user interface operating to notify the user of a second collection sharing device that a first collection sharing device has requested access to the content on the second collection sharing device;

FIGS. 8A & 8B graphically illustrate first and a second exemplary collections of digital images comprised of subject faces;

FIGS. 9A & 9B are tables illustrating which subject faces are contained in which of a first and a second exemplary collections of digital images comprised of subject faces;

FIG. 10 graphically illustrates a table showing the results of an exemplary computation used to determine collection proximity;

FIG. 11 is a block diagram of the collection sharing device of FIG. 1 according to one embodiment of the present disclosure;

FIG. 12 is a block diagram of the proxy server of FIG. 1 according to one embodiment of the present disclosure.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 is a graphical illustration of the system diagram used in the present disclosure. The system diagram is comprised of collection sharing devices 30, a proxy server 100, and a network 20.

In one embodiment, the collection sharing devices 30 communicate directly through the network 20 and the proxy server 100 is not present. In this peer-to-peer (P2P) embodiment, described in FIG. 2A, the network 20 is preferably a Near Field Communication (NFC) network, such as bluetooth and the like. A local area network (LAN) or wide area network (WAN) 20 may also be employed. In this embodiment, the detecting collection sharing device 30 executes the logic of FIG. 3.

In another embodiment, the collection sharing devices 30 communicate with the help of a proxy server 100. In this proxy assisted embodiment, described in FIG. 2B, the collection sharing devices 30 register their image collection digest 500 and location with the proxy server 100. The proxy server 100 then operates to execute the logic of FIG. 3. In this embodiment, the network 20 is preferably a distributed wide area network (WAN) with public access, such as the Internet.

In both the P2P 200 and proxy assisted 240 embodiments the computing devices are capable of interacting with and through the network 20 using various protocols such as Transmission Control Protocol/Internet Protocol (TCP/IP), Hypertext Transport Protocol (HTTP), and File Transfer Protocol (FTP).

Those of ordinary skill in the art will appreciate that the network 20 is not limited by the embodiments listed above. More specifically, the network 20 may be any type of network 20 suitable to allow interaction between the collection sharing devices 30 and the proxy server 100. For example, the network 20 may be a wired network, a wireless network, or any combination thereof. Further, the network 20 may include a distributed computing network, an intranet, a local-area network (LAN) and/or a wide-area network (WAN), or any combination thereof.

The collection sharing devices 30 are comprised of a control system 32 and an image collection 400. The control system 32 is further comprised of a proximity function 34, action function 36, and location function 38. The proximity function 34 operates to obtain the image collection digests 500 representing the two image collections 400 being analyzed. Collection proximity is determined using the matching preferences 48 specified according to the collection matching preferences dialog 600. Using the collection proximity as an input, the action function 36 operates to perform various operations involving the two image collections 400. The collection sharing device 30 may be implemented in software, hardware, or a combination of hardware and software.

In one aspect of the present disclosure, the receiving collection sharing device 30-1 user 10-1 is prompted with a detected collection dialog 620 630 to obtain an action request according to FIGS. 6B & 6C. Accordingly, the supplying collection sharing device 30-2 user 10-2 is prompted with a requesting access dialog 700 720 to grant sharing permissions to the requesting user 10-1. The actions implemented by the action function 36 may include showing the user 10-1 subject face thumbnails, image thumbnails, auto caching image content, and/or auto storing image content. The collection proximity is determined based on a number of weighting factors comprising: geographical proximity, temporal proximity, keyword proximity, author proximity, subject face proximity, image scene proximity, event proximity, and the like. The location function 38 operates with the location module hardware 1114 to supply the location of the collection sharing device 30 to the proxy server 100.

In one embodiment, the proxy server 100 operates to store and/or cache the image collection 400-100 and user account information 46 for the collection sharing device 30 user 10. As such, both collection sharing devices 30 need not be operating and available for communication at the same time. In this embodiment, the proxy server 100 performs the proximity function 34 and action function 36 using either data from the collection sharing devices 30 if available, or alternatively image collection 400 data stored at the proxy server 100. The user accounts 46 may contain information regarding users 10 matching preferences 48 and profile information. The proxy server 100 may be implemented in software, hardware, or a combination of hardware and software.

As used herein, the term subject is used to represent a person who's face appears in an image 420. The term subject face is used to represent the face of the subject in the image.

The collection sharing device 30 is used to represent any device capable of sharing digital images 420 on a network 20. Examples of collection sharing devices 30 would include personal computers, computer servers, cell smartphones, pdas, notebook computers, tablet computers, digital picture frames, digital cameras, network enabled TV's, DVR's, STB's, and the like. Indeed any electronic device capable of performing the functions attributed to the collection sharing device 30 should be considered within the scope of the disclosure. In another aspect of the present disclosure, the collection sharing device 30 is a storage only device capable of hosting an image collection 400 but not capable of displaying and/or capturing images 420.

Figure 2A:
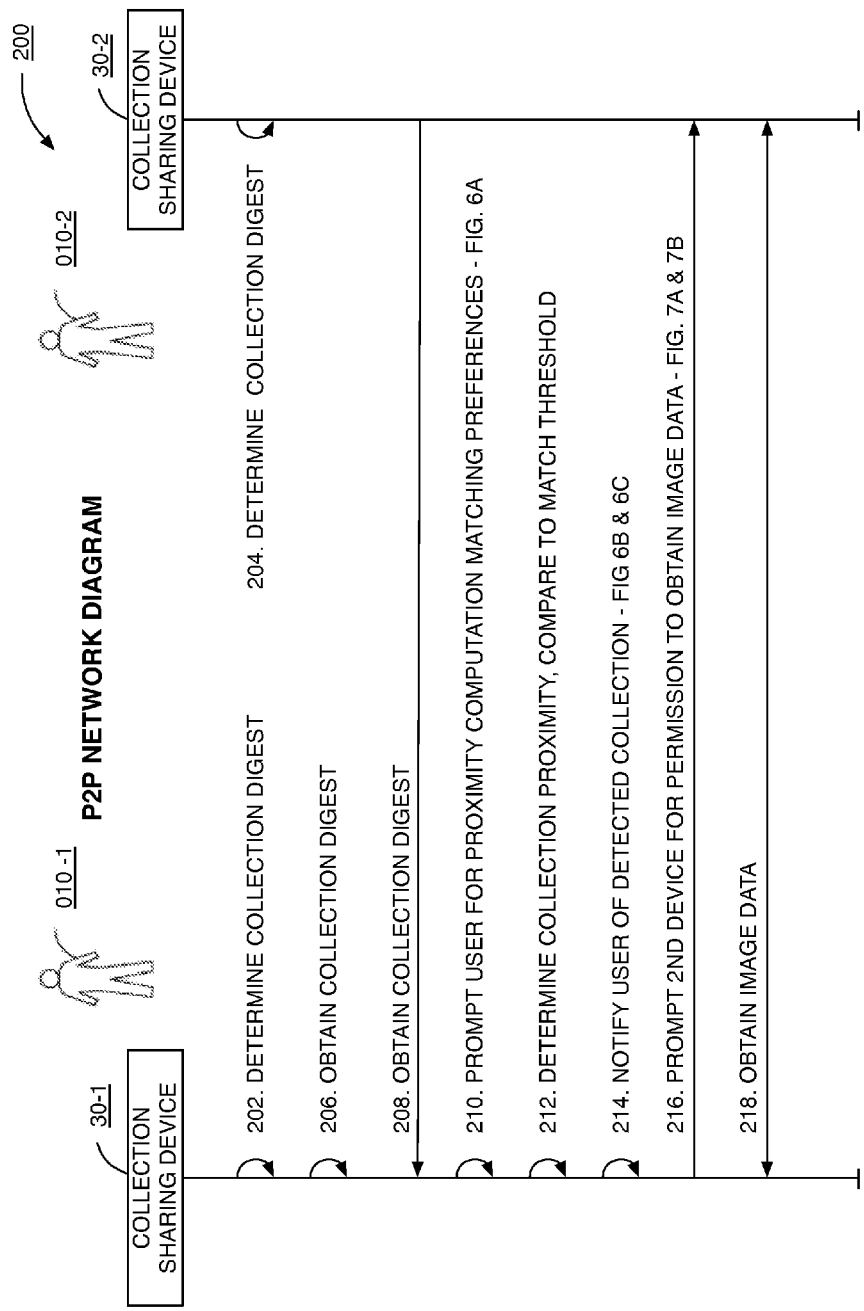
FIG. 2A illustrates the operation of the system of FIG. 1 according to one embodiment of the present disclosure.

FIG. 2A illustrates the network 20 interactions between a first and a second collection sharing device 30 in a P2P embodiment. An image collection digest 500 is determined for each collection 202 204. The first collection sharing device 30-1 obtains a first image collection digest 500-1 representing the first image collection 206 and second image collection digest 500-2 representing a second image collection 208. In one aspect of the present disclosure, the user 10-2 of the second collection sharing device 30-2 may be prompted for permission to access it's collection digest 500-2. The user 10-1 of the first collection sharing device 30-1 is prompted with a collection matching preferences dialog 600 to obtain matching preferences 48 to be used in determining the collection proximity 210. The matching preferences 48 may be stored 48-1 48-2 at the collection sharing device 30 and/or provided to the proxy server 100. Using the matching preferences 48, collection proximity is determined 212. In one aspect of the present disclosure, the collection proximity is compared to a match threshold. The user 10-1 of the first collection sharing device 30-1 is notified that the second collection sharing device 30-2 has been detected on the network 20 214 as shown in FIGS. 6B & 6C. The first collection sharing device 30-1 may be configured to notify the user 10-1 whenever another collection sharing device 30-2 is detected on the network 20 without 10-1 requiring further user 10-1 input. In another aspect of the present disclosure, the first collection sharing device 30-1 may be operated to manually search for other collection sharing devices 30-2 based on explicit user 10-1 direction. Before image data is obtained from the second collection sharing device 30-2, the user 10-2 of the second collection sharing device 30-2 is prompted with a requesting access dialog 700 720 to obtain permissions for sharing the requested image data 216. Subsequently, the request image data is transferred from the second image collection 400-2 to the first image collection 400-1 218.

In another embodiment of the present disclosure, FIG. 2A illustrates the network 20 interactions between a first and a second collection sharing device 30 and a proxy server 100 in a proxy assisted embodiment. The proxy server 100 aids in interaction between the two collection sharing devices 30 by offloading the functions of obtaining the collection digest 500, determining collection proximity, detecting the presence of other collection sharing devices 30, determining when two image collections 400 are in proximity and have subject faces in common, and the triggering actions such as prompting the receiving collection sharing device 30-1 user 10-1, prompting the supplying collection sharing device 30-2 user 10-2, and transferring image data.

Referring now to the steps of FIG. 2B, an image collection digest 500 is determined for each collection 242 244. The proxy server 100 obtains a first image collection digest 500-1 representing the first image collection 246 and second image collection digest 500-2 representing a second image collection 248. The user 10-1 of the first collection sharing device 30-1 is prompted with the collection matching preferences dialog 600 to obtain matching preferences 48 from the user 10-1 to be employed in determining the collection proximity 249. The matching preferences 48 may be stored 48-1 48-2 on the collection sharing device 30 and/or provided to the proxy server 100 250. The geographic locations for each collection sharing device 30 are periodically sent to the proxy server 100 251 252. The locations of the two collection sharing devices 30 are compared 253, and if they are within sufficient geographic proximity, the collection proximity is determined 254. In one aspect of the present disclosure, the collection proximity and match threshold are provided to the first collection sharing device 30-1 to determine a proximity match. In another aspect of the present disclosure, the proximity match is determined at the proxy server 100 and provided to the first collection sharing device 30-1. In one aspect of the present disclosure, collection proximity is determined, and compared to a match threshold to determine a proximity match 256. The user 10-1 of first collection sharing device 30-1 is prompted with the detected collection dialog 620 630 to obtain instructions describing the actions to be taken 258 and the results are sent to the proxy server 260.

Note that in the proxy assisted embodiment of FIG. 2B, determining collection proximity is triggered based on the two collection sharing devices being communicatively coupled on a network and optionally within sufficient geographical proximity. The triggering of this computation may be based on other stimulus in addition to or in replacement of geographic location information. For example, the computation may be triggered based on a modification to a collection digest 500, for example the addition of one or more images to an image collection 400. The stimulus may also include the detection of a collection sharing device 30 that has been successfully accessed in the past. Note also that in the adhoc embodiment of FIG. 2A, it is likely but not required that the two devices are in geographical proximity based on the fact that they are communicatively coupled on an adhoc network 20.

Before image data is obtained from the second collection sharing device 30-2, the user 10-2 of the second collection sharing device 30-2 is prompted with a requesting access dialog 700 720 to obtain permissions for sharing the requested image data. Subsequently, the requested image data is transferred from the second image collection 400-2 264 to the first image collection 400-1 266.

Figure 3A:
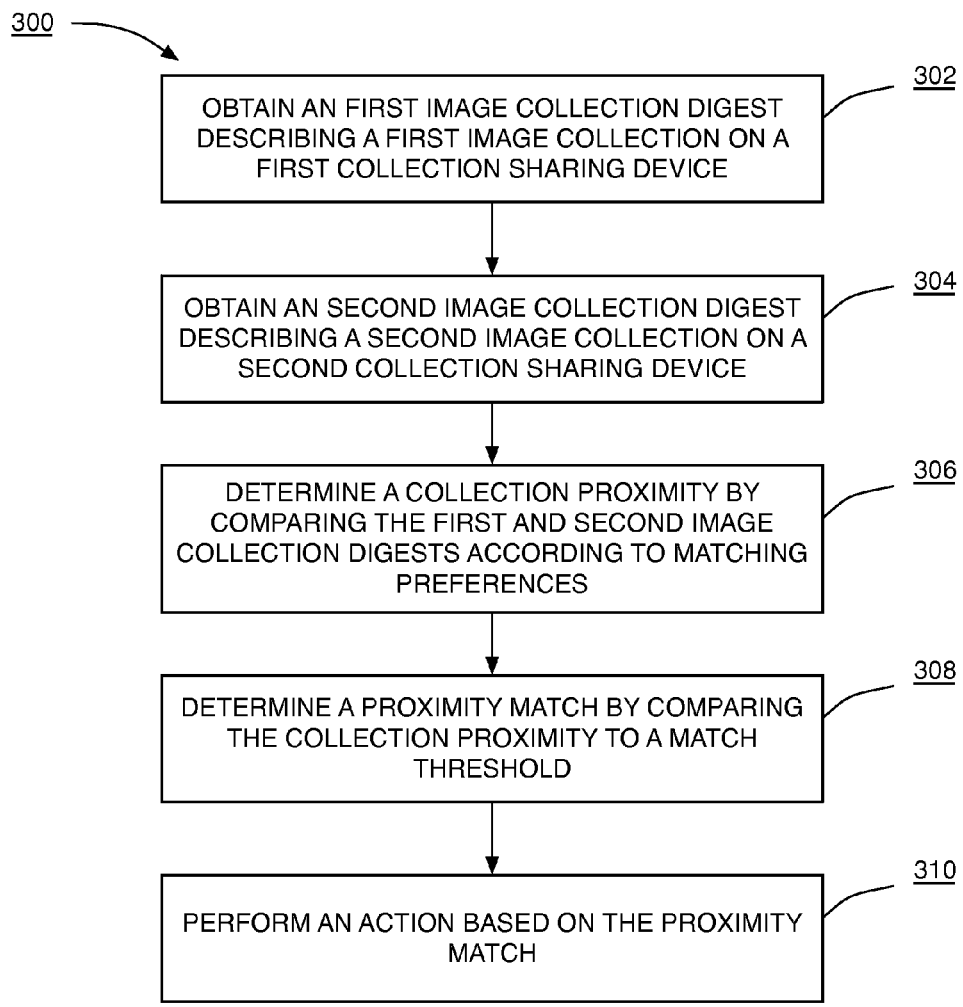
FIG. 3A illustrates the steps involved in triggering an action based on a collection proximity comparison between two image collection digest.

FIG. 3A illustrates the steps involved in the triggering of actions based on the collection proximity between two image collection digest 500 300. A first image collection digest 500-1 is obtained 302 from a first image collection 400-1, and a second image collection digest 500-2 is obtained 304 from a second image collection 400-2. An exemplary image collection digest 500 is illustrated in FIG. 5. Collection proximity is then determined 306 by comparing the first image collection digest 500-1 to the second image collection digest 500-2 according to matching preferences 48. A proximity match is determined by comparing the collection proximity to a match threshold 308. The collection proximity is determined based on a number of weighting factors including: geographical proximity, temporal proximity, keyword proximity, author proximity, subject face proximity, image scene proximity, event proximity, and the like. Finally, an action is performed 310.

Figure 3B:
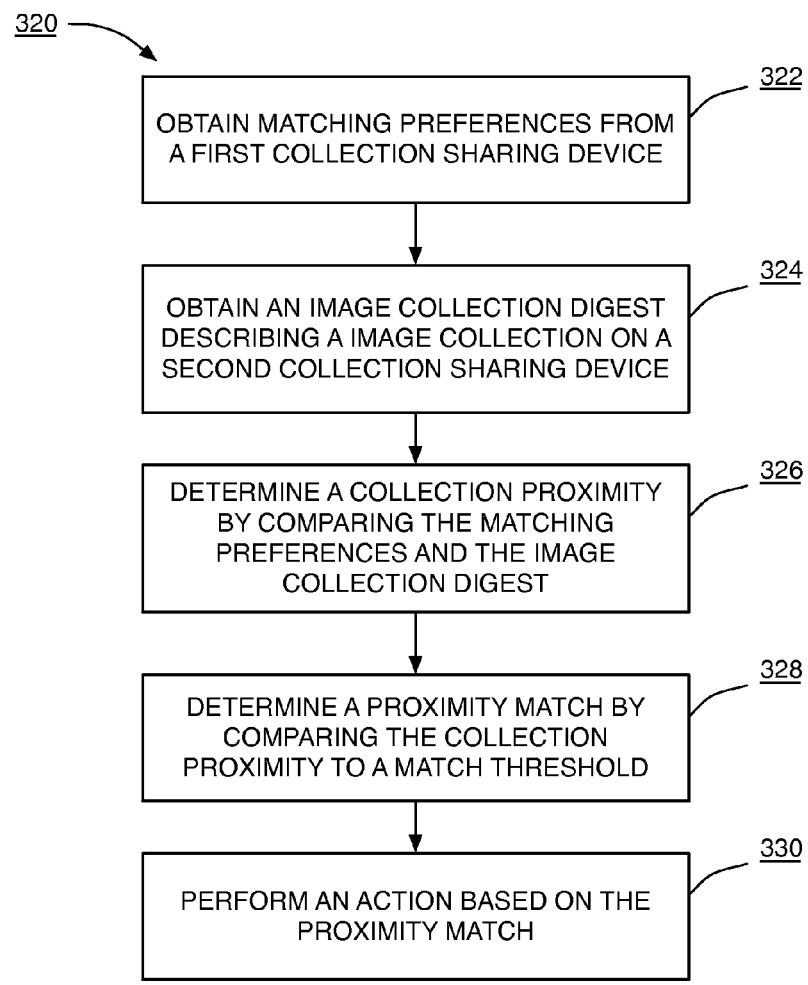
FIG. 3B illustrates the steps involved in triggering an action based on a collection proximity comparison between an image collection digest and matching preferences.

FIG. 3B illustrates the steps involved in triggering an action based on a collection proximity comparison between an image collection digest and matching preferences 320. Matching preferences 48 are obtained 322 from a first collection sharing device 30. An image collection digest 500-1 is obtained 324 from a second image collection 400-2. Collection proximity is then determined 326 by comparing the matching preferences 48 to the image collection digest 500. A proximity match is determined by comparing the collection proximity to a match threshold 328. An action is based on the proximity match 330.

FIG. 4A is a block diagram of an exemplary embodiment of the image collection 400 subsystem used in the collection sharing device 30 and proxy server 100 of FIG. 1. The image collection 400 subsystem may be implemented in software, hardware, or a combination of hardware and software. This subsystem is responsible for indexing imaging content and providing the image collection index 440 over a network 20 via the request handler 402. The image collection 400 encapsulates the code and data representing a collection of images 420. The image store 404 represents the file system containing the local images 420. The image indexer 406 contains the program codes for detecting the faces in each image 420, and building the image collection index 440. The face functions 408 module provides the image processing for facial detection, identification, and matching. The image collection 400 is indexed both by face (subject index 450) and by image (image index 460). The purpose of the image collection index 440 shown in FIG. 4C is to provide efficient programmatic access to representative images of faces found within an image collection 400, images in which a particular face is found (subject index 450), and faces within a particular image (image index 460). This efficient access is important when image collections 400 are accessed over the network 20 and network throughput and latency can degrade performance. The image collection digest 500, which provides an encapsulation of the images 420 contained in the image collection 400, is explained further in FIG. 5.

FIG. 4B is a block diagram of an exemplary embodiment of the data structure used to represent an image 420. The image 420 contains image data 422 representing the pixels of the image. The image data may be in either compressed or uncompressed form. The metadata 424 contains additional information about the image 420. The timestamp 426 fields contain the date, time, and time zone in which the image 420 was captured. The location stamp 428 holds the GPS location coordinates and optionally altitude at which the image was captured. The keyword tags 430 field contains a plurality of textual tags descriptive of the image 420. Face tags 432 contain information identifying subject faces contained in the image 420, and their corresponding locations within the images. The face tags 432 also include identity information corresponding to the subjects represented by the faces. The identity information may be in the form of the subjects name or username corresponding to an account on the proxy server 100.

FIG. 4C is a block diagram of an exemplary embodiment of the data structure used to represent an image collection index 440 as used in FIG. 4A.

The subject index 450 contains one entry per unique subject face found in an image collection 400. For each face 452, the list of images 454 in which the face appears is recorded 470 along with the center point of the face 476 within the image, and the radius of the circle containing the face 478. Other approaches for conveying the location of a face within an image are possible, such as a rectangular bounding box, and should be considered within the scope of this disclosure. This structure is advantageous because given a face reference; it is easy to quickly determine the list of images 420 in which the face appears.

The image index 460 contains one entry for each image stored in an image collection 400. For each image 462, a list of the faces 464 appearing in the image is recorded. Information regarding the center point 476, and radius 478 is also recorded. The identity information (ID) 479 is a unique identifier of the subject. In one embodiment of the present disclosure, the identity information is assigned at the proxy server 100 when a subject face is matched to a user 10 of the proxy server 100. This structure is advantageous because given an image 420 reference; it is expedient to quickly determine the list of faces contained in the image.

FIG. 4D graphically illustrates an exemplary image collection 400 indexed by both subject 496 and image 498. The subject index 450 corresponds to 496. The image index 460 corresponds to 498. As shown by the links in this illustration, each subject representation 480 482 484 486 contains a link to each image in which that face is found, and each image representation 488 490 492 494 contains a link to the subjects found within that image. For example, face 001 contains links to images 488 and 490. Likewise, image 490 contains links to the reference face image 480 for subject 001 and face image 482 for subject 002.

The image collection digest 500 is comprised of information that will enable the proximity function 34 to determine the collection proximity between two image collections 400.

The geographic information 504 represents the locations at which the images 420 comprising the image collection 400 were captured. The data in this field may be stored according to several different schemes. The geographic information may be represented as an average position for the images 420 in the image collection 400, a list of all individual geographic locations on a per image basis, a list of quantized geographic locations, etc. . . .

The temporal information 506 represents the times and dates at which the images 420 comprising the image collection 400 were captured. The data in this field may be stored according to several different schemes. The temporal information may be represented as an average time for the images 420 in the image collection 400, a list of all individual times on a per image basis, a list of quantized times, etc. . . . Also, the times and dates may be represented together as a single entity, or are separate entities.

The keyword Information 508 represents the keywords or tags that have been used to categorize the images comprising the image collection 400. The data in this field may be stored according to several different schemes. The keyword information may be stored as a histogram indicating the frequency of occurrence of each keyword within the collection, or it may be stored on a per image basis.

The author information 510 represents the identity of the person or entity who captured the images 420 comprising the image collection 400. The data in this field may be stored according to several different schemes. The author information may be stored as a histogram indicating the frequency of occurrence of each author within the collection, or it may be stored on a per image basis.

The subject face information 512 represents the subjects found in the images 420 comprising the image collections 400. The data in this field may be stored according to several different schemes. The subject face information 512 may be stored as a histogram indicating the frequency of occurrence of each subject face within the collection, or it may be stored on a per image basis. This information may also be made available through the use of the image collection index 440.

The image scene information 514 is used to represent the various image scene types found in the image collections 400. Examples of image scene information include sports, landscape, portrait, etc. In one embodiment of the present disclosure, this information is stored in the images 420 at the time they are captured, as many cameras have the ability to specify scene information to the camera to aid in the determination of auto focus auto, auto white balance, and auto exposure settings. The image scene information 514 may be stored as a histogram indicating the frequency of occurrence of each image scene type within the collection, or it may be stored on a per image basis.

The event Information 516 represents the keywords or tags that have been used to categorize the images comprising the image collection 400. As used herein, an event is defined by both a geographic location and a time interval. For example, an event might be specified by GPS coordinates specifying an event location, a radius representing space around the event location, and an event time interval. Using this information, it is possible to assign two images to the same event. Examples of events might include parties, gatherings, sporting events, weddings, and the like. In another aspect of the present disclosure, matching the users 10 present at the event location during the event time interval may further specify an event. The data in this field may be stored according to several different schemes. The event information may be stored as a histogram indicating the frequency of occurrence of each event within the collection, on a per image basis, a list of images assigned to events, and the like.

In another aspect of the present disclosure, the image collection index 440 may be used as the image collection digest 500, or may be supplied in addition to the image collection digest 500. When the image collection index 440 is used in place of the image collection digest 500, all metadata summarized in the image collection digest 500 fields 504 506 508 510 512 514 is available as metadata from the subject references 452 and image references 462. Those of ordinary skill in the art will appreciate that the image collection digest 500 is not limited by the embodiments listed above. Many variations are possible, and should be considered within the scope of the present disclosure.

FIG. 6A illustrates a collection matching preferences dialog 600 that may be presented to the user 10 of the collection sharing device 30 for the purpose of allowing the user 10 to specify matching preferences 48 that may be used in determining collection proximity between a first image collection digest 500-1 and a second image collection digest 500-2. As used herein, proximity is used to describe a level of similarity or match between two entities. Two entities are said to have a higher proximity if they are very similar, and a lower proximity if they are very different.

As used herein, collection proximity may be determined using a number of weighting factors, comprising: geographical proximity, temporal proximity, keyword proximity, author proximity, subject face proximity, image scene proximity, event proximity, and the like. Using the matching preferences 48, the user 10 may also assign weights to the various factors. For example, the collection proximity may be determined with all weighting factors given equal weight (e.g. all of the check boxes selected 602-614), or proximity may be determined by a single factor (e.g. only the subject faces check box selected 610). While not shown in FIG. 6A, other UI's are possible and would allow the user to assign the weighting factors values on a sliding scale, as opposed to the simple on off provided by the checkboxes.

The Matching Preferences Dialog 600 has two primary sections. The weighting factors checkboxes 601 allow the user 10 to specify which weighting factors are used in determining collection proximity. The source menus 603 allow the user to select the source of the data that will be compared to the image collection digest 500-2 from the supplying collection sharing device 30-2. The default operation is for the source 616 of the comparison data to be the image collection digest 500-1 from the receiving collection sharing device. However, the user may specify another source 618 for the data, or provide the data explicitly. As an example, a user 10 may choose to explicitly specify the subject faces they are interested by manually selecting those subject faces from their image collection 400-1 that they are most interested in. In another aspect of the present disclosure, the user 10 may specify subject faces of interest through external information sources such as Facebook Connect™. Using Facebook Connect™, the user may direct their collection sharing device 30-1 to import social graph information describing friends and their corresponding subject faces for use in matching.

Selecting the geographic check box 602 indicates to the collection proximity function 306 to use the geographic locations at which the images comprising the two image collections 400 were captured in determining collection proximity. As a result, two image collections 400 both comprising images captured in the same city would have higher collection proximity than two image collections 400 comprising images captured in two different cities respectively.

Selecting the temporal check box 604 indicates to the collection proximity function 306 to use the time at which the images comprising the two image collections 400 were captured in determining collection proximity. As a result, two image collections 400 both comprising images captured in the same day would have higher collection proximity than two image collections 400 comprising images captured on two different days respectively.

Selecting the keyword check box 606 indicates to the collection proximity function 306 to use the keywords attached to the images comprising the two image collections 400 in determining collection proximity. As a result, two image collections 400 both comprising images tagged with the same keyword would have higher collection proximity than two image collections 400 comprising images tagged with two different keywords respectively.

Selecting the author check box 608 indicates to the collection proximity function 306 to use the author information attached to the images comprising the two image collections 400 in determining collection proximity. As a result, two image collections 400 both comprising images with the same author information would have a higher collection proximity than two image collections 400 comprising images with difference author information respectively.

Selecting the subject face check box 610 indicates to the collection proximity function 306 to use the subject faces comprising the two image collections 400 in determining collection proximity. As a result, two image collections 400 both comprising images containing the same subject faces would have a higher collection proximity than two image collections 400 comprising images containing different subject faces respectively.

Selecting the image check box 612 indicates to the collection proximity function 306 to use image scene information from the images comprising the two image collections 400 in determining collection proximity. As a result, two image collections 400 both comprising images having the same image scene information would have a higher collection proximity than two image collections 400 comprising images containing different image scene information respectively.

Selecting the event check box 614 indicates to the collection proximity function 306 to use event information from the images comprising the two image collections 400 in determining collection proximity. As a result, two image collections 400 both comprising images captured at the same event would have a higher collection proximity than two image collections 400 comprising images captured at different events.

Referring now to FIG. 6B, in another aspect of the present disclosure in response to a receiving collection sharing device 30-1 detecting the presence of a supplying collection sharing device 30-2 on the network 20, the user 10-1 of the receiving collection sharing device 30-1 may be presented with the detected collection dialog 620 presenting information regarding the detected image collection 400-2 displaying subject faces appearing in the supplying collection sharing device 30-2. The subject faces 622 that are found in both collections 400 are displayed to the user 10-1, and the user 10-1 is presented with the option 624 to display the images containing the subject faces 622 or to store the images in their image collection 400-1 for later use 626. Selecting to display the images containing the subject faces 622 results in the user 10-1 being presented with the detected collection by image dialog 630. The user 10-1 may exit the process completely by selecting cancel 628.

Referring now to FIG. 6C, in response to a receiving collection sharing device 30-1 detecting the presence of a supplying collection sharing device 30-2 on the network 20, the user 10-1 of the receiving collection sharing device 30-1 may be presented with the detected collection dialog 630 presenting information regarding the detected image collection 400-2 displaying images appearing in the supplying collection sharing device 30-2. Images 632 comprising subject faces occurring most often (highest subject proximity) in both image collections 400 are shown to the user 10-1, and the user 10-1 is presented with the option 634 to display the subject faces found in both image collections 400 or to store the images for later use 636. Selecting 634 to display the faces found most often in both image collections 400 results in the user 10-1 being presented with a detected collection by face dialog 620. The user 10-1 may exit the process completely by selecting cancel 638.

Referring now to FIG. 7A, after the user 10-1 of the receiving collection sharing device 30-1 has been prompted with a detected collection dialog 620 630, the user 10-2 of the supplying collection sharing device 30-2 may be prompted with a requesting access by face dialog 700 prompting the user 10-2 for permission to access images comprising selected subject faces. The user 10-2 of the supplying collection sharing device 30-2 may be shown the subject faces 702 that appear most often in both collections 400 (highest subject proximity). The user 10-2 is then allowed to grant access to all images containing these subject faces 704, to grant access to all faces in the collection 706, to grant access in exchange for bidirectional access 708 (thereby gaining access to the collection of the receiving collection sharing device 30-1), to interact with a requesting access by image dialog 720, or to deny access altogether 712.

Referring now to FIG. 7B, in another aspect of the present disclosure after the receiving collection sharing device 30-1 has been prompted with a detected collection dialog 620 630, the user 10-2 of the supplying collection sharing device 30-2 may be prompted with a requesting access by image dialog 720 prompting the user 10-2 for permission to access selected images. The user 10-2 of the supplying collection sharing device 30-2 may be shown the images containing subject faces that appear most often in both collections 722. The requesting user 10-1 is then allowed to grant access to all images containing these subject faces 724, to grant access to all images in the collection 726, to grant access in exchange for bidirectional access 728 (access to the collection of the receiving device), to show a requesting access by face dialog 700, or to deny any access 732.

It should be noted that while FIGS. 6B, 6C, 7A, and 7B focus on the use of face information for requesting and granting access, other paradigms are possible and should be considered within the scope of this disclosure. For example, any of the weighting factor categories—geographic, temporal, keyword, author, image scene, or event—could be used. It is also possible to use combinations of the categories when constructing the criteria on which access could be requested or granted.

FIGS. 8-10 show an exemplary computation for determining subject proximity, and corresponding collection proximity. FIGS. 8A & 8B illustrate two exemplary image collections, wherein the images in the collection are comprised of subject faces. For simplicity sake, the same subject, when present in an image, always appears in the same location in the image. This is for illustration purposes only. In this particular example, collection proximity is determined solely from subject proximity information. This would correspond to a user selecting only the subject face checkbox 610 of the collection matching preferences dialog 600.

FIG. 8A is a graphical depiction of an exemplary first image collection 400. The image collection 400 contains eight images comprised of six different faces. FIG. 9A represents a matrix 900 showing which of the images contain which of the faces. Finally, the bottom row of the table 902 shows an occurrence count indicating how many times each face appears within the image collection 400, while the right hand column 904 shows an occurrence count indicating how many subjects appear within each image.

FIG. 8B is a graphical depiction of an exemplary second image collection 400. The image collection 400 contains eight images comprised of six different faces. FIG. 9B represents a matrix 910 showing which of the images contain which of the faces. Finally, the bottom row of the table 912 shows an occurrence count indicating how many times each face appears within the image collection 400, while the right hand column 914 shows an occurrence count indicating how many subjects appear within each image.

FIG. 10 represents an exemplary computation for determining subject face proximity and subsequently an overall collection proximity. The first row 1001 shows the match confidence multipliers, which is a measure of confidence ranging between 0 and 1 indicating the confidence that the individual subject face match is correct. The second row 1002 indicates the number of times each subject face occurs in a first image collection 400-1 while the third row 1004 indicates the number of times the same face occurs within the second image collection 400-2. The fourth row 1006 gives the product of the individual face occurrence counts for the two collections 400 (product of rows 2 and 3). The bottom row of the table indicates the subject match certainty measures 1008. A match certainty of 0 means that the subject face may occur in one image collection 400 or the other, but not both (e.g. the system was unable to match the subject face of a user in first collection to the subject face of a user in the second collection). A non-zero subject match certainty indicates that it is possible that the subject occurs in both image collections 400. The subject match certainty measures are normalized to a maximum of 1, which indicates the highest correlated subject(s). A match certainty of 1 indicates that it is certain that the subject face occurring in a first image collection 400-1 and a subject face occurring in second image collection 400-2 correspond to the same user or person.

In the case where collection proximity is based solely on subject face information (e.g. only subject face checkbox 610 is selected) the collection proximity is computed by summing the product of each individual subject occurrence counts (OC) scaled by the match certainty (MC). The match certainty being a measure of the probability that two subject faces from two image collections 400 are indeed the same subject.

$$\text{subject}_{proximity} = \text{NORMALIZED}[OC_{collection1} * OC_{collection2} * MC] \quad \text{Equation (1)}$$

$$\text{collection}_{proximity} = \frac{1}{numberofimages} \sum_{n=0}^{numbersubjects-1} \text{subject}_{proximity}[n] \quad \text{Equation (2)}$$

The numberofimages in equation 2 is the sum of the count of unique images found in the two image collections 400 being compared. In the example of FIG. 10, collection proximity is determined according to Equation 3.

$$\text{collection}_{proximity} = \frac{1}{16} \sum_{n=0}^{7} 0 + .73 + .27 + 0 + 0 + 1 + .13 + 0 = \frac{2.13}{16} = 1.333 \quad \text{Equation (3)}$$

Other schemes for computing subject face proximity and collection proximity will be apparent to one of ordinary skill in the art upon reading this disclosure and are to be considered within the scope of the present disclosure.

FIG. 11 is a block diagram of a collection sharing device 30 (e.g., one of the one or more collection sharing devices 30 of FIG. 11 according to one embodiment of the present disclosure. As illustrated, the collection sharing device 30 includes a controller 1104 connected to memory 1106, one or more communications interfaces 1108, one or more user interface components 1110, one or more storage devices 1112, a location module 1114, and an image capture module by a bus 1102 or similar mechanism. The controller 1104 is a microprocessor, digital ASIC, FPGA, or the like. In this embodiment, the controller 1104 is a microprocessor, and the control system 32 is implemented in software and stored in the memory 1106 for execution by the controller 1104. In this embodiment, the location module 1114 is a hardware component such as, for example, a GPS receiver. The communications interface 1108 is a wireless communication interface that communicatively couples the collection sharing device 30 to a network 20. For example, the communications interface 1108 may be a local wireless interface such as a wireless interface operating according to one of the suite of IEEE 802.11 standards, bluetooth, or the like. The one or more user interface components 1110 include, for example, a touchscreen, a display, one or more user input components (e.g., a keypad), a speaker, or the like, or any combination thereof. The storage device(s) 1112 is a non-volatile memory used to store the image collection 400 and the like.

FIG. 12 is a block diagram of a proxy server 100 of FIG. 1 according to an embodiment of the present disclosure. As illustrated, proxy server 100 includes a controller 1244 connected to a memory 1246, one or more secondary storage devices 1230, and one or more communications interfaces 1228 by a bus 1222 or similar mechanism. The controller 1224 is a microprocessor, digital Application Specific Integrated Circuit ASIC, Field Programmable Gate Array FPGA, or the like. In this embodiment, the controller 1224 is a microprocessor, and the control system 40 is implemented in software and stored in the memory 1226 for execution by the controller 1224. Further, the user accounts 46 may be stored in the one or more secondary storage devices 1230. The secondary storage devices 1230 are digital data storage devices such as, for example, one or more hard disk drives. The communications interface 1228 is a wired or wireless communication interface that communicatively couples the proxy server 100 to the network 20 of FIG. 1. For example, the communications interface 1228 may be an Ethernet interface, local wireless interface such as a wireless interface operating according to one of the suite of IEEE 802.11 standards, or the like.

EXAMPLES

The following example scenarios are intended to provide non-limiting illustrations of potential uses of the present disclosure.

Scenario #1: adhoc collection matching

1. Fred (user 10-1) has a digital picture frame (collection sharing device 30-1) in his kitchen.

2. The images 420 stored on Fred's (user 10-1) digital picture frame (collection sharing device 30-1) contain the faces of Cindy, Jan, and Marsha.

3. Billy (user 10-2) comes to visit Fred (user 10-1) at his home and walks into the kitchen. Billy (user 10-2) is carrying a smartphone (collection sharing device 30-2) capable of hosting an image collection 400. The images 420 on Billy's (user 10-2) smartphone also contain the faces of Cindy, Jan, and Marsha, among others.

4. After both joining the same adhoc network 20, Fred's (user 10-1) digital picture frame (collection sharing device 30-1) detects the presence of Billy's (user 10-2) smartphone (collection sharing device 30-2).

5. Fred's (user 10-1) digital picture frame (collection sharing device 30-1) obtains an image collection digest 500-2 from Billy's (user 10-2) smartphone (collection sharing device 30-2), and compares it to an image collection digest 500-1 of it's own image collection 200-1.

6. Fred's (user 10-1) digital picture frame (collection sharing device 30-1) determines that Billy's (user 10-2) smartphone contains images 420 of interest due to the overlap of the faces present in the image collections 200—both image collections 200 contain images 420 containing the faces of Cindy, Jan, and Marsha.

7. Fred's (user 10-1) digital picture frame (collection sharing device 30-1) prompts Fred (user 10-1) with a detected collection dialog 620 630 indicating that additional images 420 of interest are available.

8. Several representative thumbnails are retrieved from Billy's (user 10-2) smartphone (collection sharing device 30-2) and displayed on Fred's digital picture frame (collection sharing device 30-1).

9. Fred (user 10-1) interacts with the digital picture frame (collection sharing device 30-1), choosing to receive additional images 420 from Billy's (user 10-2) smartphone (collection sharing device 30-2).

10. Images 420 are transferred from Billy's (user 10-2) smartphone (collection sharing device 30-2) to Fred's (user 10-1) digital picture frame (collection sharing device 30-1) over the network 20.

Scenario #2: Proxy Assisted Collection Matching

1. Fred (user 10-1) has a digital picture frame (collection sharing device 30-1) in his kitchen.

2. The images 420 present on Fred's (user 10-1) digital picture frame (collection sharing device 30-1) contain the faces of Cindy, Jan, and Marsha.

3. Fred's (user 10-1) digital picture frame (collection sharing device 30-1) communicates with a proxy server 100 over the network 20 to register it's location and image collection digest 500-1.

4. Billy (user 10-2) comes to visit Fred (user 10-1) at his home and walks into the kitchen. Billy (user 10-2) is carrying a smartphone (collection sharing device 30-2) capable of hosting an image collection 400. The images on Bill's (user 10-2) smartphone also contain the faces of Cindy, Jan, and Marsha, among others.

5. Billy's (user 10-2) smartphone (collection sharing device 30-2) communicates with a proxy server 100 over the network 20 to register it's location and image collection digest 500-2.

6. The proxy server recognizes that both Fred's (user 10-1) digital picture frame (collection sharing device 30-1) and Billy's (user 10-2) smartphone (collection sharing device 30-2) are in geographic proximity, and that both collections 200 contain images 420 containing the faces of Cindy, Jan, and Marsha.

7. The proxy server 100 communicates with Fred's (user 10-1) digital picture frame (collection sharing device 30-1) causing it to prompt Fred (user 10-1) with a detected collection dialog 620 630 indicating that additional images 420 of interest are available.

8. Several representative thumbnails are retrieved from Billy's (user 10-2) smartphone (collection sharing device 30-2) and displayed on Fred's (user 10-1) digital picture frame (collection sharing device 30-1).

9. Fred (user 10-1) interacts with the digital picture frame (collection sharing device 30-1), choosing to receive additional images 420 from Billy's (user 10-2) smartphone (collection sharing device 30-2).

10. Images 420 are transferred from Billy's (user 10-2) smartphone (collection sharing device 30-2) to Fred's (user 10-1) digital picture frame (collection sharing device 30-1) over the network 20.

Scenerio #3: Adhoc Collection to Preferences Matching (e.g Real Time Capture Notification)

1. Lucy (user 10-1) is attending a party, and has a smartphone (collection sharing device 30-1) in her pocket.

2. Lucy (user 10-1) would like to know if anyone captures an image at the party where her face appears in the image.

3. Lucy's (user 10-1) smartphone (collection sharing device 30-1) specifies only her face in her matching preferences 48-1.

4. Jill (user 10-2) is also at the party and is taking pictures with a network enabled camera (collection sharing device 30-2). Jill (user 10-2) happens to take a picture in which Lucy's (user 10-1) face appears, and the image gets stored in the image collection 400-2 on Jill's (user 10-2) camera (collection sharing device 30-2), and Lucy's (user 10-1) face gets added to the collection digest 500-2, 5. Lucy's (user 10-1) smartphone (collection sharing device 30-1) periodically scans for the presence of other collection sharing devices 30, and obtains an updated collection digest from Jill's (user 10-2) camera (collection sharing device 30-2).

6. Lucy's (user 10-1) smartphone (collection sharing device 30-1) compares the her match preferences 48-1 to the obtained collection digest 500-2 obtained from Jill's (user 10-2) camera (collection sharing device 30-2) and determines a proximity match.

7. Lucy's (user 10-1) smartphone (collection sharing device 30-1) prompts her with a detected collection dialog 620 630 indicating the presence of images 420 that may be of interest to her.

8. The new image captured by Jill's (user 10-2) camera (collection sharing device 30-2) is copied to Lucy's (user 10-1) smartphone (collection sharing device 30-1) for later use.

Those skilled in the art will recognize improvements and modifications to the preferred embodiments of the present disclosure. All such improvements and modifications are considered within the scope of the concepts disclosed herein and the claims that follow.

What is claimed is:

1. A computer implemented method comprising:
    obtaining from a first collection sharing device a first image collection digest;
    obtaining from a second collection sharing device a second image collection digest;
    determining a collection proximity by comparing the first image collection digest and the second image collection digest wherein a proximity match is determined by comparing the collection proximity to a matching threshold; and,
    performing an action based on the proximity match, wherein the action performed comprises notifying a user of the first collection sharing device that the second collection sharing device is communicatively coupled over a network.

2. The method of claim 1, wherein the action performed further comprises displaying an image of a subject face corresponding to a subject appearing in at least one image in both the first image collection and the second image collection.

3. The method of claim 2 wherein the subject is selected based on subject face proximity.

4. The method of claim 1, wherein the first image collection digest and the second image collection digest are comprised of an image collection index.

5. A computer implemented method comprising:
    obtaining from a first collection sharing device a first image collection digest;
    obtaining from a second collection sharing device a second image collection digest;
    determining a collection proximity by comparing the first image collection digest and the second image collection digest, wherein a proximity match is determined by comparing the collection proximity to a matching threshold; and,
    performing an action based on the proximity match, wherein the action performed comprises obtaining an image from the second collection sharing device at the first collection sharing device.

6. The method of claim 5, wherein the image is comprised of a subject face corresponding to a subject appearing in at least one image in both the first image collection and the second image collection.

7. A computer implemented method comprising:
    obtaining from a first collection sharing device a first image collection digest;
    obtaining from a second collection sharing device a second image collection digest; and,
    determining a collection proximity by comparing the first image collection digest and the second image collection digest, wherein the second image collection digest is obtained again from the second collection sharing device when the second image collection digest stored at the second collection sharing device is modified.

8. The method of claim 7, wherein the modification is comprised of an additional image being stored in the second image collection at the second collection sharing device.

9. The method of claim 8 wherein the additional image is stored in the second image collection at the second collection sharing device after being captured by the second collection sharing device.

10. A computer implemented method comprising:
    obtaining from a first collection sharing device a first image collection digest;
    obtaining from a second collection sharing device a second image collection digest; and,
    determining a collection proximity by comparing the first image collection digest and the second image collection digest, wherein obtaining the first image collection digest and the second image collection digest occurs at the first collection sharing device.

11. The method of claim 10, wherein the collection proximity is determined at the first collection sharing device.

12. The method of claim 10, wherein the first image collection digest and second image collection digest are obtained at the first collection sharing device in response to the first collection sharing device detecting the second collection sharing device on a network.

13. The method of claim 12, wherein the first collection sharing device and the second collection sharing device are communicatively coupled over an LAN.

14. A computer implemented method comprising:
obtaining from a first collection sharing device a first image collection digest;
obtaining from a second collection sharing device a second image collection digest; and,
determining a collection proximity by comparing the first image collection digest and the second image collection digest, wherein obtaining the first image collection digest and the second image collection digest occurs at a proxy server and wherein the second image collection digest is obtained at the proxy server from the second collection sharing device in response to the proxy server determining that the first collection sharing device and the second collection sharing device are in geographical proximity.

15. The method of claim 14, wherein the collection proximity is determined at the proxy server.

16. The method of claim 14, wherein the first collection sharing device, the second collection sharing device, and the proxy server are communicatively coupled over a WAN.

17. A computer implemented method comprising:
obtaining from a first collection sharing device a first image collection digest;
obtaining from a second collection sharing device a second image collection digest; and,
determining a collection proximity by comparing the first image collection digest and the second image collection digest, wherein the collection proximity is determined as a function of a count of subject faces occurring at least once in both the first image collection and the second image collection.

18. A computer implemented method comprising:
obtaining from a first collection sharing device a first image collection digest;
obtaining from a second collection sharing device a second image collection digest; and,
determining a collection proximity by comparing the first image collection digest and the second image collection digest, wherein the collection proximity is determined as a function of a count of images containing subject faces occurring at least once in both the first image collection and the second image collection.

19. A computer implemented method comprising:
obtaining from a first collection sharing device a first image collection digest;
obtaining from a second collection sharing device a second image collection digest; and,
determining a collection proximity by comparing the first image collection digest and the second image collection digest, wherein the collection proximity is determined based on weighting factors selected from the group consisting of geographical proximity, temporal proximity, keyword proximity, author proximity, subject face proximity, image scene proximity, and event proximity.

* * * * *